(12) United States Patent
Sun et al.

(10) Patent No.: US 12,414,026 B2
(45) Date of Patent: Sep. 9, 2025

(54) SECONDARY LINK ACCESS TO A MOBILE SOFT ACCESS POINT MULTI-LINK DEVICE

(71) Applicants: SONY GROUP CORPORATION, Tokyo (JP); SONY CORPORATION OF AMERICA, New York, NY (US)

(72) Inventors: Li-Hsiang Sun, San Jose, CA (US); Mohamed Abouelseoud, Burlingame, CA (US); Liangxiao Xin, San Jose, CA (US); Qing Xia, San Jose, CA (US)

(73) Assignees: SONY GROUP CORPORATION, Tokyo (JP); SONY CORPORATION OF AMERICA

( * ) Notice: Subject to any disclaimer, the term of this patent is extended or adjusted under 35 U.S.C. 154(b) by 504 days.

(21) Appl. No.: 17/679,795

(22) Filed: Feb. 24, 2022

(65) Prior Publication Data
US 2022/0345973 A1    Oct. 27, 2022

Related U.S. Application Data

(60) Provisional application No. 63/263,497, filed on Nov. 3, 2021, provisional application No. 63/178,359, filed on Apr. 22, 2021.

(51) Int. Cl.
*H04W 40/02* (2009.01)
*H04W 74/0816* (2024.01)
*H04W 84/12* (2009.01)

(52) U.S. Cl.
CPC ....... *H04W 40/02* (2013.01); *H04W 74/0816* (2013.01); *H04W 84/12* (2013.01)

(58) Field of Classification Search
CPC ... H04W 28/04; H04W 72/04; H04W 72/042; H04W 88/08; H04W 40/02; H04W 74/0816; H04L 5/0007

(Continued)

(56) References Cited

U.S. PATENT DOCUMENTS 11,641,685 B2 * 5/2023 Kim ................. H04W 76/11
                                                     370/329
11,696,322 B2 * 7/2023 Vaidya .............. H04W 52/0216
                                                     370/329

(Continued)

FOREIGN PATENT DOCUMENTS

CN       112714472          4/2021
CN       112714472 A  *     4/2021    ............ H04W 28/06

(Continued)

OTHER PUBLICATIONS

Hong et al., Channel access rules for NSTR AP MLD, Date: Feb. 9, 2021, doc: IEEE802.11-20/1858r0. (Year: 2021).*

(Continued)

*Primary Examiner* — Peter G Solinsky
*Assistant Examiner* — Sanjay K Dewan
(74) *Attorney, Agent, or Firm* — O'BANION & RITCHEY LLP; John P. O'Banion

(57) ABSTRACT

An IEEE 802.11 wireless protocol which allows a non-Access Point Multi-Link Device (non-AP MLD) to access a soft AP MLD (e.g., an MLD which is not configured for Simultaneous Transmit and Receive (STR)) over a conditional link (Link2) when the primary/basic link (Link1) is occupied by another STA/MLD. Additional frame exchanges are described between MLDs to facilitate the Non-AP MLD's ability to accessing the soft AP MLD. Utilizing the approach can increase overall network throughput in a single BSS or OBSS.

21 Claims, 25 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0150214 A1* | 5/2019 | Zhou | ............... | H04W 76/15 370/329 |
| 2021/0112543 A1* | 4/2021 | Das | ............... | H04B 17/318 |
| 2023/0103810 A1* | 4/2023 | Kim | ............... | H04W 36/00692 370/329 |
| 2023/0117918 A1* | 4/2023 | Jang | ............... | H04W 76/15 370/329 |
| 2023/0119901 A1* | 4/2023 | Viger | ............... | H04W 76/15 370/329 |
| 2023/0121480 A1* | 4/2023 | Guo | ............... | H04W 74/085 370/329 |
| 2023/0128479 A1* | 4/2023 | Jang | ............... | H04L 27/26 370/329 |
| 2023/0133701 A1* | 5/2023 | Cariou | ............... | H04L 5/0053 370/329 |
| 2023/0140556 A1* | 5/2023 | Ko | ............... | H04W 74/085 370/329 |
| 2023/0156606 A1* | 5/2023 | Kim | ............... | H04W 84/12 370/329 |
| 2023/0156796 A1* | 5/2023 | Han | ............... | H04W 76/15 370/329 |
| 2023/0156797 A1* | 5/2023 | Han | ............... | H04W 76/15 370/329 |
| 2023/0217521 A1* | 7/2023 | Kim | ............... | H04W 76/15 370/329 |
| 2023/0224989 A1* | 7/2023 | Kim | ............... | H04W 88/06 370/329 |
| 2023/0254802 A1* | 8/2023 | Kim | ............... | H04W 28/02 370/329 |
| 2023/0254920 A1* | 8/2023 | Kim | ............... | H04W 48/16 370/329 |
| 2023/0319884 A1* | 10/2023 | Ko | ............... | H04W 28/10 370/329 |
| 2023/0328774 A1* | 10/2023 | Jang | ............... | H04W 74/0808 370/329 |

FOREIGN PATENT DOCUMENTS

| | | | | |
|---|---|---|---|---|
| EP | 3 846 574 A1 | * | 7/2021 | ............ H04W 74/08 |
| GB | 2620223 A | * | 3/2023 | ............ H04W 76/15 |
| WO | WO-2021008502 A1 | | 1/2021 | |

OTHER PUBLICATIONS

Hanseul Hong et al; Channel access rules for NSTR AP MLD, doc.: IEEE 802.11-20/1858r0, Channel access rules for NSTR AP MLD, Feb. 2021. (Year: 2021).*

Xin et al., Channel Access for STR AP MLD with non-STR non-AP MLD, Date: Jan. 18, 2021, doc.: IEEE 802.11-20/0974r4. (Year: 2021).*

Yang et al., Survey and Perspective on Extremely High Throughput (EHT) WLAN—IEEE 802.11be, Mobile Networks and Applications (2020) 25:1765-1780. (Year: 2020).*

Hanseul Hong (Wilus): "Channel access rules for NSTR AP MLD", IEEE Draft; 11-20-1858-00-00BE-Channel-Access-Rules-for-NSTR-AP-MLD, IEEE-SA Mentor, Piscataway, NJ USA vol. 802.11 EHT; 802.11be Feb. 9, 2021 (Feb. 9, 2021), pp. 1-12, XP068178699.

Liangxiao Xin (Sony) : "Channel Access for STR AP MLD with non-STR non-AP MLD", IEEE Draft; 11-20-0974-04-00BE-Channel-Access-for-STR-AP-MLD-With-Non-STR-NON-AP-MLD, IEEE-SA Mentor, Piscataway, NJ USA, vol. 802.11 EHT; 802.11be, No. 4 , Jan. 29, 2021 (Jan. 29, 2021). pp. 1-16, XP068176084.

Yang, Mao et al., "Survey and Perspective on Extremely High Throughput (EHT) WLAN—IEEE 802.11be", .Mobile Networks and Applications, Appl. 25, https://doi.org/10.1007/s11036-020-01567-7, published online Jun. 16, 2020, pp. 1765-1780.

Matthew Fischer (Broadcom Inc),MLO-Synch-Transmission, IEEE 802.11-20/0081r2, IEEE, Internet<URL:https://mentor.ieee.org/802.11/dcn/20/11-20-0081-02-00be-mlo-synch-transmission.pptx>Jan. 10, 2020.

* cited by examiner

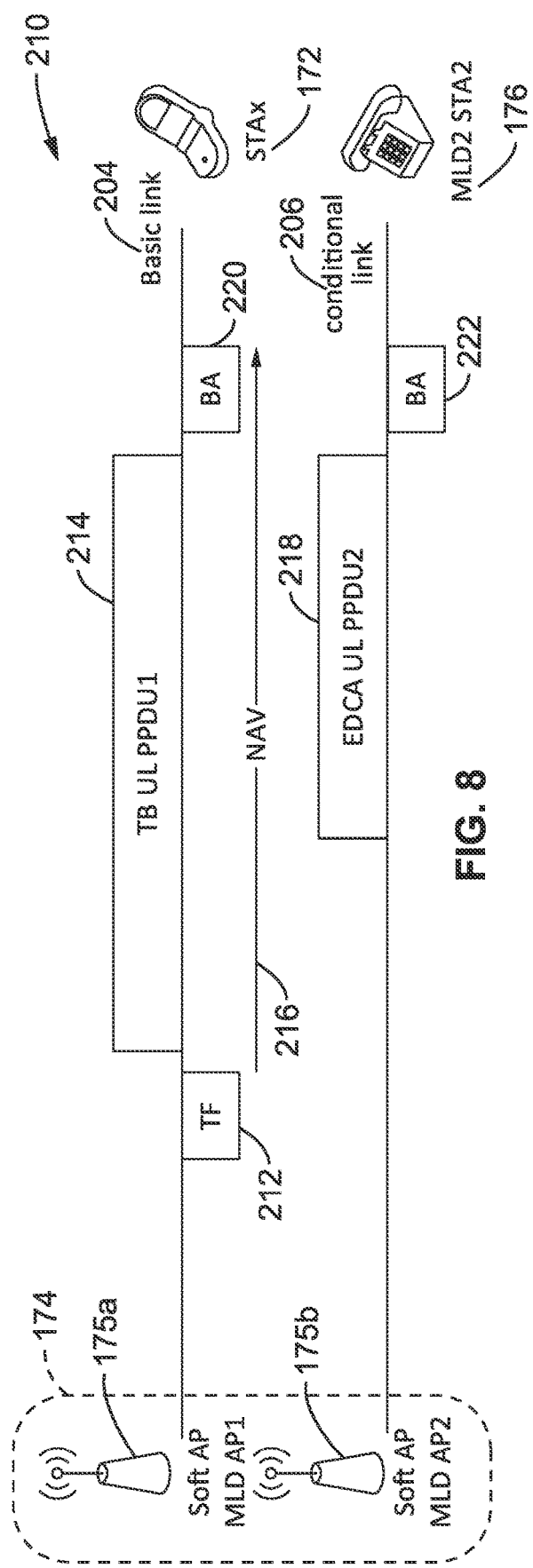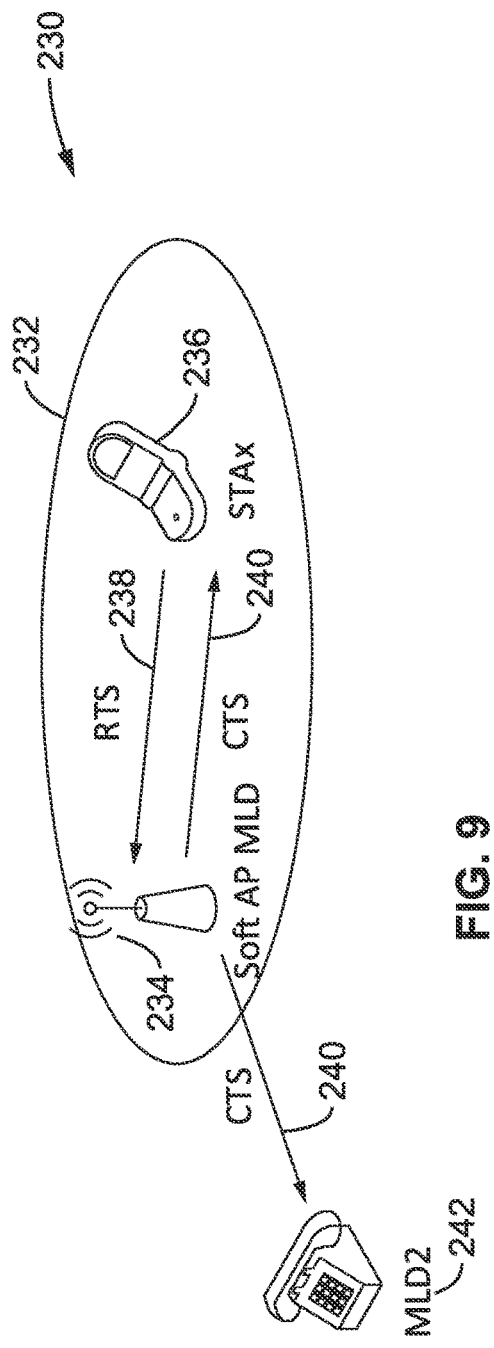
FIG. 8
FIG. 9

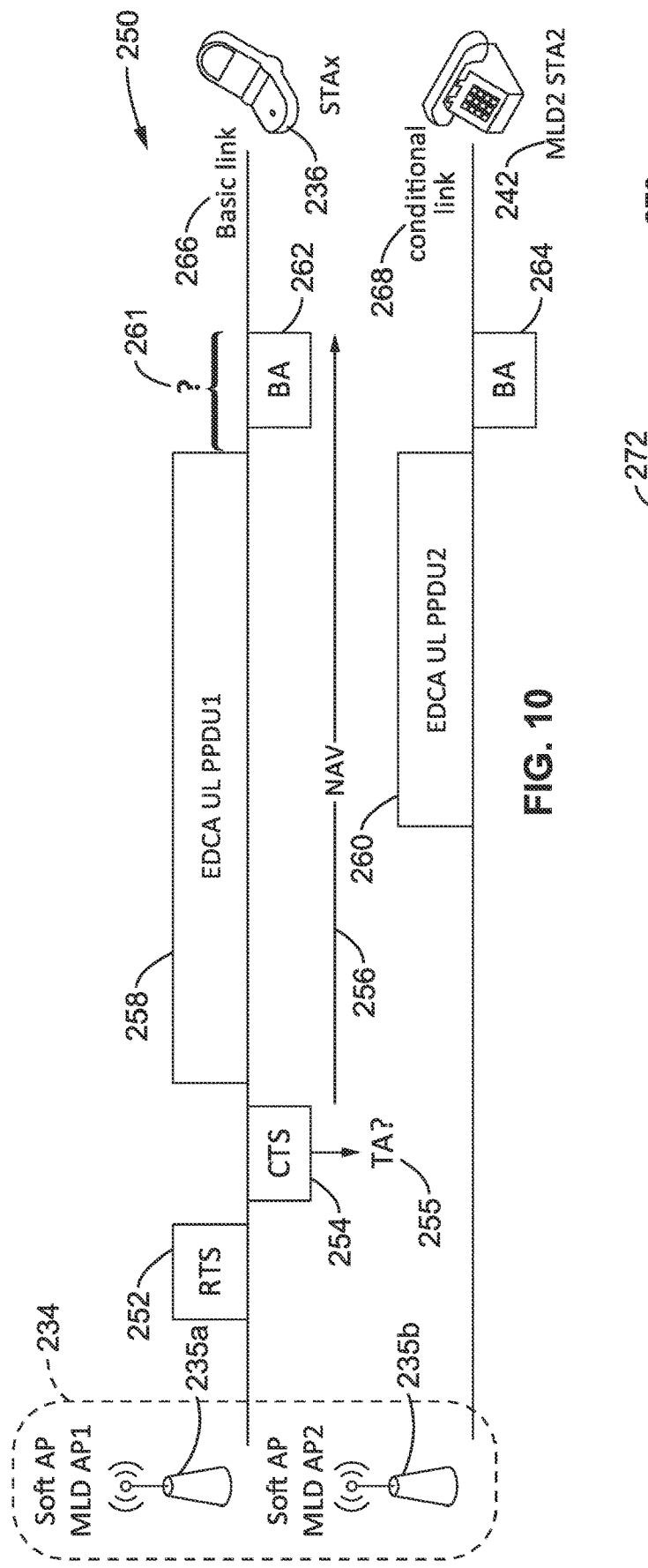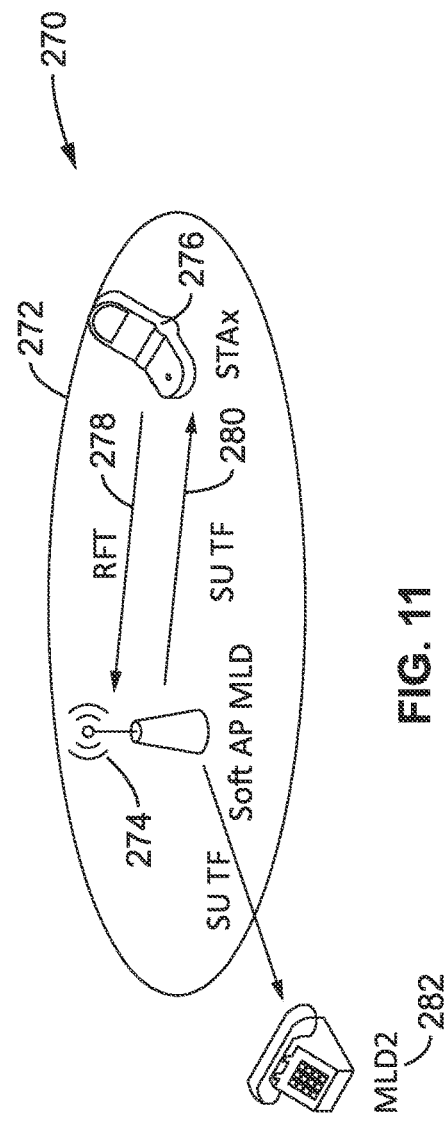
FIG. 10
FIG. 11

SECONDARY LINK ACCESS TO A MOBILE SOFT ACCESS POINT MULTI-LINK DEVICE

CROSS-REFERENCE TO RELATED APPLICATIONS

This application claims priority to, and the benefit of, U.S. provisional patent application Ser. No. 63/263,497 filed on Nov. 3, 2021, and claims priority to, and the benefit of, U.S. provisional patent application Ser. No. 63/178,359 filed on Apr. 22, 2021, each incorporated herein by reference in their entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to multi-link operations (MLOs) in multi-link devices (MLDs), and more particularly to relaxing soft Access Point (AP) requirements on Multi-Link Devices (MLDs).

2. Background Discussion

IEEE P802.11be/D0.3 has defined a Multi-link Operation toward supporting the following scenarios: (1) An AP MLD which can transmit on Link1 and receive on Link2 simultaneously and/or vice versa, as Simultaneous Transmit/Receive (STR), for example within a STR Access Point (AP) Multi-Link Device (MLD) on the pair of links. (2) A non-AP MLD which is STR on the pair of links. (3) A non-AP MLD which is non-STR on the pair of links. It will be noted that the primary link is also denoted as a basic link, or Link1, while the non-primary link is denoted as a conditional link or Link2 in this document.

The IEEE 802.11be Task Group (TGbe) has agreed to a concept of a soft AP MLD proposed in another proposal with non-STR AP, but the access procedure to/from the AP MLD has not been agreed upon at this time. The soft AP MLD is a non-STR MLD.

Some proposals for Multi-Link Operation (MLO) in regard to Soft AP MLD operation describe access procedures to/from the AP MLD, in which for example the sender of an Enhanced Distributed Channel Access (EDCA) transmission occupying a non-primary link (Link2) must also occupy a primary link (Link1). The above proposal indicates one proposal having the following non-AP requirement. A STA affiliated to the non-AP MLD may initiate a PPDU transmission to its associated soft AP in the non-primary link only if the STA affiliated to the same MLD in the primary link is also initiating the PPDU as a TXOP holder with the same start time.

The present requirements for soft AP MLD unduly limit certain activity and reduce overall network throughput.

Accordingly, a need exists for improved multi-link operations MLO dealing with soft AP MLDs. The present disclosure overcomes those issues and provides additional advantages.

BRIEF SUMMARY

The present disclosure relates to IEEE 802.11 protocols and particularly relevant to 802.11be (Wi-Fi). A wireless 802.11 protocol is described having different constraints for multi-link operations. Procedures are described which allow a non-AP MLD to access a soft AP MLD when the primary/basic link (Link1) is occupied by another STA/MLD. Additional frame exchanges are described to facilitate the Non-AP MLD to use the procedure for accessing the soft AP MLD.

The current requirement for the soft AP MLD and its associated non-AP MLDs leaves a secondary link unused if the AP used by a legacy STA or a STA MLD which does not transmit on the 2nd link. The proposed technologies propose additional frame exchanges to facilitate the Non-AP MLD use of the conditional link.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 8 is a communication diagram of a second case of soft AP UL access on a conditional link according to at least one embodiment of the present disclosure.

FIG. 9 is a topology diagram for an example MLO using RTS/CTS on the basic link according to at least one embodiment of the present disclosure.

FIG. 10 is a communication diagram of a case with RTS/CTS on the basic link, according to at least one embodiment of the present disclosure.

FIG. 11 is a topology diagram for an example MLO on a basic link using a request for trigger frame as an alternative to RTS/CTS according to at least one embodiment of the present disclosure.

DETAILED DESCRIPTION

1. Introduction

The present disclosure provides for enhanced Multi-Link Operations in regard to accessing a soft AP MLD when there is already an ongoing transmission to the AP MLD on a primary link. For a soft AP MLD, transmission on one link can creates self-interference to the receiver on another link.

2. Embodiments 2.1. Station Hardware Configuration

Figure 1:
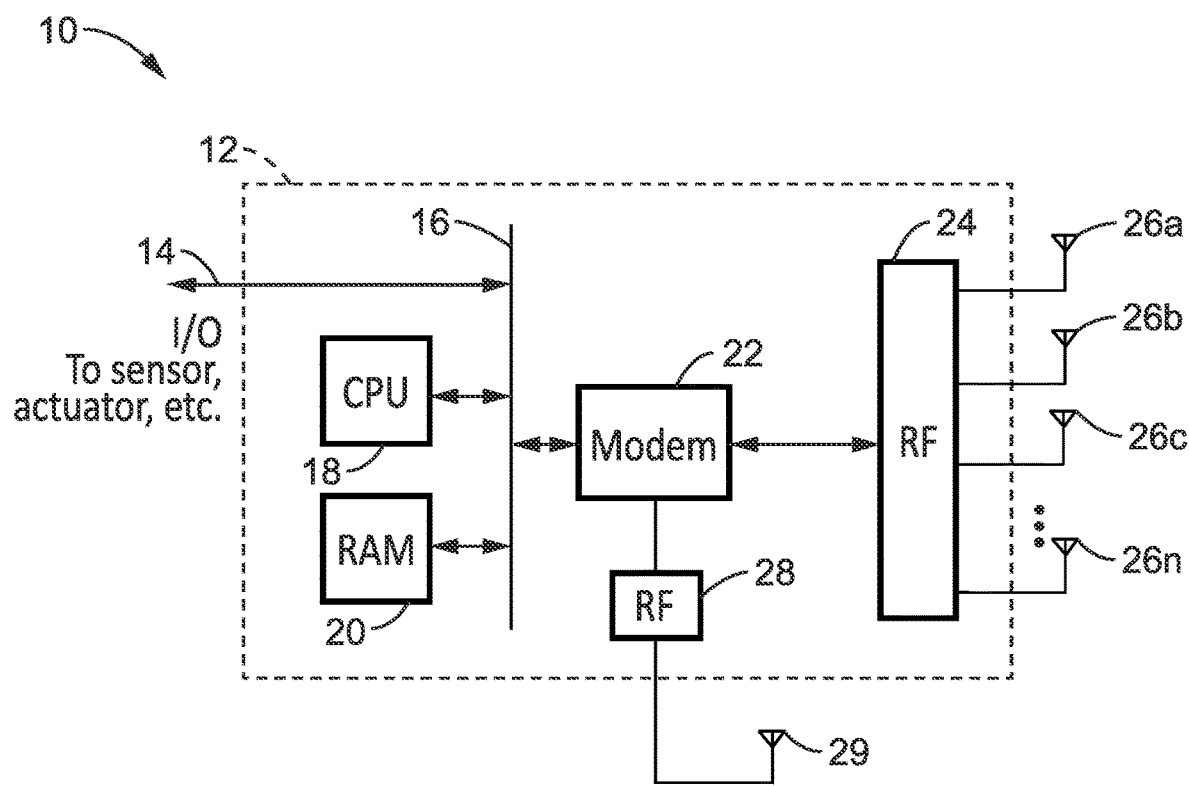
FIG. 1 is a hardware block diagram of wireless station (STA) hardware according to at least one embodiment of the present disclosure.

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 2:
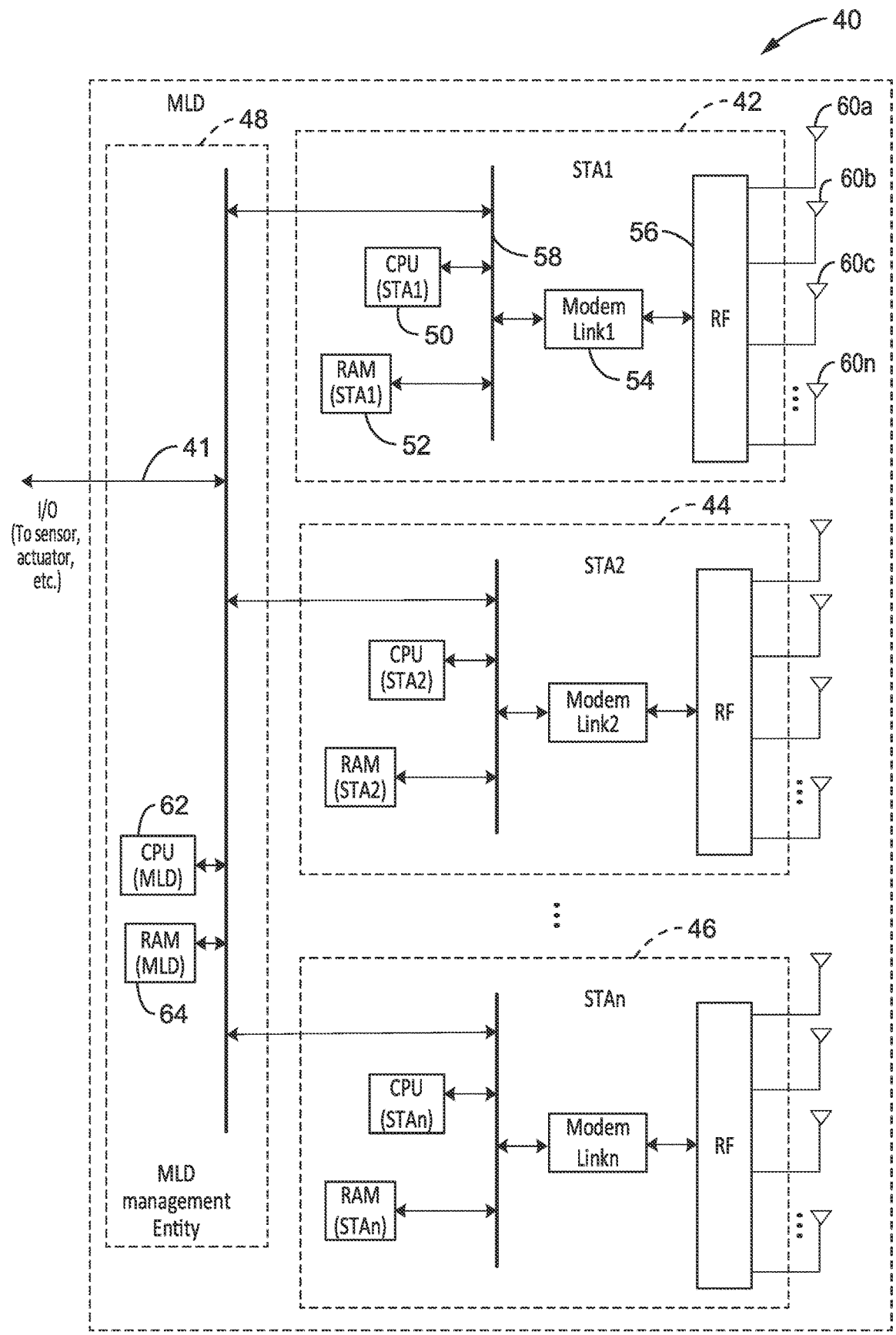
FIG. 2 is a hardware block diagram of a station configuration, such as contained in Multi-Link Device (MLD) hardware, according to at least one embodiment of the present disclosure.

FIG. 2 illustrates an example embodiment 40 of a Multi-Link Device (MLD) hardware configuration. Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

3. Operational Summary

The characteristics of the presently disclosed MLO operations are generally outlined below in these elements. Primary/basic link is sometimes referred to as link1, while the secondary/conditional link is sometimes referred to as link2.

(1) An AP Multi-Link Device (MLD), which is not capable of simultaneous transmission on its first link (Link1) and reception on its second link (Link2), or the converse, receives an UL PPDU1 from one or more STAs on Link1.

(2) A non-AP MLD which monitors Link1 and Link2 determines the length of the UL PPDU1, and may perform UL access of a UL PPDU2 on Link2 with the end of UL PPDU2 approximately aligned to the end time of the UL PPDU1 subject to the following. (a) The non-AP MLD determines if Link2 is CCA idle prior to UL access, and (b) the length of UL PPDU1 is determined by the non-AP MLD using the preamble of the UL PPDU1, or (c) the length of UL PPDU1 is determined by the non-AP MLD from a frame y sent by the AP MLD on Link1 prior to the UL PPDU1.

(3) The non-AP MLD may perform Enhanced Distributed Channel Access (EDCA) UL access to the AP MLD on Link2 if: (a) a STA affiliated to the non-AP MLD in Link1 is initiating the PPDU as a TXOP holder with the same start time, or (b) a STA affiliated to the non-AP MLD in Link1 is not initiating the PPDU as a TXOP holder and the conditions in characteristic Element 2 are satisfied.

(4) The frame y sent by AP MLD on Link1 in 2c above may be (a) a Trigger frame, or (b) a Block Acknowledge (BA) or an Acknowledgement (ACK) frame, or (c) a frame which is a response to a frame x sent by a sender of the UL PPDU1, prior to the transmission of the UL PPDU1. In the case of (a) and frame y a SU trigger frame, a control frame may be sent by the sender of PPDU1 before the start of the PPDU1.

(5) The frame y sent by AP MLD on Link1 in Element 2c above may contain info to derive some or all of the following: (a) the length (in time) of UL PPDU1; (b) the expected (minimum) length (in time) of the acknowledgement of UL PPDU1; (c) the identity of the AP affiliated with the AP MLD on Link1 or the identity of the AP MLD; (d) the identity of Link2; (e) the NAV (or CCA status) of the AP affiliated with the AP MLD on Link2; (f) whether the NAV in element 5e above was set, because: (f)(i) the AP affiliated with the AP MLD on Link2 is a TXOP holder or responder (i.e. directly involved in a communication), or (f)(ii) the AP affiliated with the AP MLD on Link2 is a 3rd party to a TXOP on Link2 and thus not directly involved in a communication but in within communications range.

(6) The frame x sent by the sender of UL PPDU1 in 4c above may contain info to derive: (a) the length (in time) of the UL PPDU1; (b) the expected length (in time) of the acknowledgement of the UL PPDU1; (c) the link(s) expected to be occupied or not occupied by the sender.

(7) The AP MLD may determine the info in element above 5 from the info obtained in element 6 above.

(8) The non-AP MLD in element 2 may determine the following characteristics of the UL PPDU2 based on the information obtained in Element 5 or from the preamble of UL PPDU1, and the start time of the UL PPDU2, such that the ACK/BA to the UL PPDU2 on Link2 is not overlapping in time with the duration of a PPDU on Link1 which follows the ACK/BA to the ULPPDU1 (e.g., end of ACK/BA on Link2 responding to UL PPDU2 is not later than the end of ACK/BA on link1 responding to UL PPDU1). The characteristics are the following: (a) number of TIDs in the PPDU; (b) number of MPDUs in the PPDU; (c) Forward Error Correction (FEC) padding, such as Pre-FEC padding and/or post-FEC padding in the PPDU; (d) MCS or number of spatial streams/Bandwidth of the PPDU.

(9) A frame z may be sent on Link2 by the AP MLD with the same start and/or end time as the start/end time of the frame y sent by AP MLD on Link1 in element 2c above. The frame z sent on Link2 may contain the same info as in element 5. (a) The non-AP MLD in Element 2 may use frame z sent on Link2 to determine the length of the UL PPDU1, in addition to the methods in element 2. (b) A STA on Link2 not monitoring Link1 may use the frame z sent on Link2 to determine the length of the UL PPDU1, to perform UL access on Link2 with alignment to the end of PPDU on UL PPDU1. (c) The frame z may be of a different frame format as frame y. The frame z may be padded to have the same end time as frame y.

(10) A frame w may be sent on the Link2 by the sender of UL PPDU1 with the same start and/or end time as the start and/or end time of the frame x in element 4c sent on Link1. The frame w sent on Link2 may contain the same info as in element 6.

(11) If the length (in time) of the UL PPDU1 is less than a pre-determined threshold, then the sender of the UL PPDU1 should not perform the transmission of frame x as in element 4c on Link1, neither should the frame w be sent on Link2 as in element 10.

(12) The non-AP MLD in element 2 should not perform UL access on Link2 even if all the conditions in element 2 are satisfied, except that the time length of UL PPDU1 is less than a pre-determined threshold.

(13) The frames x and y in element 4c may be used for the protection of the UL PPDU1.

(14) The non-AP MLD in element 2 may not be capable of simultaneous transmission on Link1 and reception on Link2 and/or the converse.

(15) The Request for Trigger (RTF) frame in the example section on basic link in this example is that of frame x.

(16) The SU trigger frame on the basic link in this example is that of frame y.

(17) The Request for Trigger (RTF) frame on the conditional link in the example section is an example of frame w.

(18) The SU trigger frame on the conditional link in the example section is an example of frame z. In this case, a control frame may be sent by the sender of PPDU2 before the start of the PPDU2

(19) The BA1 frame on the conditional link in the example section is an example of frame z.

(20) The basic link in the example sections is an example of Link1.

(21) The conditional link in the example sections is an example of Link2.

(22) The non-AP MLD in element 2a may be used the information element 5e to determine whether CCA is idle at AP MLD on Link2.

(23) In element 2, the sender of UL PPDU1 may be a STA affiliated with the non-AP MLD on Link1, with these characteristics. (a) The non-AP MLD may be capable of simultaneous transmission on Link1 and reception on Link2 as well as the converse. (b) The UL PPDU1 length and the corresponding ACK duration is determined within the non-AP MLD; and the procedures for frames x, y, w, z may not apply.

(24) The sender of UL PPDU1 may be required to send frame x on Link1 (and/or frame w on link2) prior to the EDCA access for UL PPDU1, if Link2 is not used by the sender of UL PPDU1 at the same time when transmitting UL PPDU1.

(25) If the expected acknowledgement length information is not provided as in element 5b, then the non-AP MLD in element 2c may use a predetermined ACK length to derive the possible values in element 8.

(26) The non-AP MLD in element 2b may use a predetermined ACK length to derive the possible values in element 8.

(27) In elements 25 and 26, the predetermined ACK length may be determined by some or all of the following: the MCS of the UL PPDU1, a fixed ACK bitmap/frame size, the basic rate set of Link1, and/or a PPDU format of the ACK/BA to the UL PPDU1.

(28) The AP MLD may not transmit an ACK/BA to UL PPDU2 unless it also transmits an ACK/BA to UL PPDU1.

(29) The non-AP MLD sending UL PPDU2 may set the NAV in UL PPDU2 until the end of the expected ACK/BA to UL PPDU1. The non-AP MLD sending UL PPDU2 may set the NAV in UL PPDU2 beyond the end of the expected ACK/BA to UL PPDU1 to cover the preamble duration of a next PPDU following the ACK/BA to PPDU1.

(30) The AP MLD responding to UL PPDU2 may pad the responding ACK/BA frame on Link2 to end at approximately the same time as the end of ACK/BA responding to UL PPDU1. The responding ACK/BA frame may be in a format of Multi-STA BA frame with special per-AID TID Info subfield(s) as padding, or may be contained in an Aggregated MAC Protocol Data Unit (AMPDU).

(31) A soft/mobile AP MLD may announce a max AMPDU size, or max PPDU size S as a time duration. (a) S may be only applicable to the non-AP MLD/STA's transmission/TXOP which occupies the primary link (link1) only. (b) S may be only applicable in specific service periods such as a broadcast TWT, a restricted TWT. (c) The S may be chosen based on the loading/latency target of the UL traffic/TID that is mapped to the secondary link (link2) and/or loading of the primary link. (c)(i) A shorter S provides more access opportunities on link2 with end alignment to PPDU on link1. (d) The duration of BA from the AP MLD responding to a PPDU subjected to the size S may be fixed and announced by the AP. (e) The duration of BA from the AP MLD responding to a PPDU subjected to size S may be based on a fixed sized bitmap/PPDU format announced by the AP and the duration can be determined by a STA observing the preamble of the PPDU (e.g., from the MCS of the PPDU and primary/alternate rate). (f) AP may announce or require UL ACs for TIDs mapped to link2 having TXOP limit 0 on link2 when performing end alignment with PPDU sent on link1.

(32) A soft AP MLD may perform TID-link mapping for a latency tolerant UL TID on the primary link (link1) only, and/or may perform TID-link mapping for a latency sensitive UL TID on the primary link and secondary link(s) when using the mechanism in element 31 above and the mechanism in element 2. (a) The latency sensitive traffic and latency tolerant traffic are using different TIDs. (b) UL latency tolerant traffic cannot be sent on the secondary link based on the above mapping.

(33) The mapping in element 32 may be only effective in specific service periods, such as for example a broadcast TWT or a restricted TWT. (a) The maximum size S restriction above in element 31 may only take effect in the service period(s). (b) The service period may allow UL access on the secondary link (link2) with end time alignment to an UL PPDU on the primary link (link1) from another STA/MLD as described in 2. (c) The TID-link mapping described in element 32 may be only effective in the service period.

(34) A MLD x may access a soft AP MLD on link2 without the condition that another UL data PPDU is occupying link1. (a) The access may start with a short frame exchange such as RTS/CTS with AP on link2. (b) The access may start with a short frame exchange, such as RTS/CTS with AP on both link1 and link2. (b)(i) The short frames may contain the end time of the data PPDU. (c) A MLD/STA "y" having an intent to access link1 (primary link), may align the end of PPDU sent on link1 with the ongoing PPDU on link2, either by observing the preamble of the PPDU on link2, or based on the short frame on either link1 or link2.

(35) A MLD that is the TXOP holder on link1 (primary) and link2 (secondary) may abort/end the TXOP if it does not receive an immediate (rapid) response on link1. (a) The AP MLD may send CF-end frames on link1 or link2 to truncate the TXOP.

(36) The alignment described in element 2 on link2 may be performed by padding of the PPDU sent on link2, or by a delay in EDCA access without the padding of the PPDU, or by a combination of the two approaches.

(37) The frame z in element 9 may be a trigger frame assigning UL resources on link2 to a different MLD/STA than the MLD/STA accessing on link1. (a) The requirement in element 24 that a MLD sending frame x (on link1) and w (on link2) to obtain TXOP on both links may be applicable to an AC/EDCAF/TID that is not mapped to link2 but mapped to link1. The access on link2 with frame w is used by AP MLD to obtain the TXOP to send a trigger frame in the reverse direction, or used by the AP MLD to indicate link2 CCA busy by not responding to frame w with frame z.

(38) The Clear Channel Assessment (CCA) of Enhanced Distributed Channel Access (EDCA) access in element 2 on the secondary link (link2) may have a higher threshold (e.g., a lowered ED threshold) because the access cannot be performed with RTS/CTS frame exchange.

(39) The method in element 2 may be limited to the case that the receiving APs of UL PPDU1 and ULPPDU2 are affiliated with the same AP MLD, or with different AP MLDs but collocated.

(40) As an alternative to element 2, by using approximate end of PPDU alignment with link1 PPDU, the non-AP MLD in element 2 may send a UL PPDU2 with an end time that is earlier than the end time of the PPDU1 on link1. (a) The acknowledgement to PPDU2 is aggregated with the acknowledgement to PPDU1 and is sent on link1: (a)(i) ACKs to different STAs/MLDs may be in a MU-PPDU, and/or (a)(ii) ACKs to different STAs/MLDs may be a Multi-STA BA frame. (a)(iii) MPDU in PPDU2 need not solicit an immediate ACK but to request an ACK at a later time. (b) This allows another MLD to use link2 for UL transmission before the end of PPDU1. (b) This allows another MLD to use link2 for UL transmission before the end of PPDU1. (c) The non-AP MLD sending PPDU2 which ends earlier than PPDU1 and requesting ACK may pause EDCA countdown operation on link2 for the primary AC of the PPDU2 until the end of a response to PPDU1 and PPDU2 on link1. Then the MLD may use the ACK status to PPDU2 to determine the new EDCA parameters for link2 such as CW.

(41) The sender of a PPDU may be required to terminate the TXOP if not receiving response to the PPDU. (a) This requirement may be applied if the TXOP corresponds to a low priority Access Class (AC) and the TXOP holder does not have higher priority traffic buffered. (b) This requirement may be applied if another link is CCA busy at the start or during the TXOP.

(42) The PPDU1 in element 2 may have an indication that the subsequent PPDU(s) from the TXOP holder in the same TXOP have the same PPDU duration. (a) The control response to PPDU1 may also carry/echo the same indication if it is indicated in PPDU1. (b) The MLDs using a mechanism in element 2 for sending PPDU2 on link2, may start another PPDU SIFS after the control response to PPDU2. (c) The control response to PPDU2 may also carry/echo the same indication if it is indicated in PPDU1. (d) The AP MLD may perform padding on control responses for link1 or link2, such that they are approximately the same duration.

(43) The MLDs using a mechanism to access link 2 in element 2 may not receive acknowledgement to the PPDU2. The reason for missing the response may be collision or another factor. (a) The MLD may send a PPDUn on link2, without end-alignment, to PPDUm on link1 from another STA/MLD after a consecutive number of attempts when using the mechanism in element 2 and it exceeds a threshold. (b) The control response to a PPDU(m−1) on link1 may indicate that link2 access without end alignment to the next PPDUm on link1 in the same link1 TXOP is allowed. (c) A frame sent on link2 by AP MLD as a response to PPDU collision on link2 may indicate that it is allowing link2 access to be performed without end alignment to the next PPDUm on link1 in the same link1 TXOP. (d) The AP MLD may send a control response to PPDUn on link2 while missing a portion of the received PPDUm on link1 due to self-interference and lack of end-alignment. (e) The AP MLD may send a control response to PPDUn on link1 using the mechanism in element 40 after receiving PPDUm.

(44) The end of the NAV duration of PPDU2 in element 2 may be later than the end of the control response to PPDU2. (a) The extra duration may be required to be equal to, or longer than, the preamble of PPDU1 on link1. (b) The extra NAV can be used to prevent access from OBSS during the procedure in element 2b if another access on link2 is needed for the same, or different MLD, from the same BSS.

(45) The access on link2 may be conditioned on the pathloss/distance to the AP. (a) Two MLDs that are far away from the AP MLD, and which are hidden nodes to each other, may use the mechanism in element 2 based on the same PPDU1 and this creates collision. (b) The minimum power of PPDU2 may be calculated based on a formula that takes the received power of frames received on link1 or link2 as input. If the potential sender of PPDU2 cannot meet this power requirement, then in at least one mode or embodiment, it may not be allowed to perform the procedure in element 2 for accessing link2.

(46) If the PPDU1 in element 2 is an OBSS PPDU, the access on link2 using end-alignment may not be allowed. (a) The non-AP MLD may still access link2 upon knowing the AP MLD intends to pause intra-BSS activity on link1 for a certain duration. (b) A short initial frame, such as an RTS frame, may be required to obtain a TXOP on link2 and inquire on the AP MLDs intention of pausing link1 activity. (b)(i) The requirement of using the initial frame on link2 may be conditioned on link1 CCA busy by OBSS. (c) The AP MLD's responding frame on link2 (such as a CTS frame) may revise/shorten the NAV set by the initial frame. (c)(i) The responding frame's NAV on link2 may be based on link1 (basic) NAV at AP MLD set by OBSS STAs. The NAV in the responding frame may represent an agreement from the AP that before the end of (revised) link2 NAV, AP MLD does not plan to send PDUs/receive intra BSS PPDUs on link1. (d) The MLD sending the initial frame in a. may not continue link2 TXOP without receiving the responding frame in element (b) above. (e) The MLD sending the initial frame in a. may continue link2 TXOP after receiving the responding frame in b. However, it must terminate the TXOP by the time indicated by the NAV of the responding frame. (e)(i) For example, sending a CF-End frame on link2 by the time indicated by the NAV of the responding frame, if the end of NAV from the initial frame has been revised by the responding frame. (f) A STA accessing link1 may be required to send RTS/initial frame to obtain a TXOP. The AP which has determined to pause intra-BSS activity on link1 may not respond to the RTS/initial frame.

(47) The operating BandWidth (BW) of a link may be a number that is not 20/40/80/160 (80+80)/320 MHz. (a) For example, if soft AP MLD operates on an 80 MHz bandwidth, it may allocate 60 MHz as a primary link (link1), and allocate two of 20 MHz channels as secondary links (link2). The AP announces legacy operating BW as 40 MHz on primary link. (a)(i) The allocating of operating BW not in the set of 20/40/80/160 (80+80)/320 MHz can be performed with 20/40/80/160 (80+80)/320 MHz BW with puncturing, and possibly the punctured BW allocated to other link(s). (b) The AP MLD may allocate different associated non-AP MLDs different secondary links while these different non-AP MLDs share the same primary link. (b)(i) Compared to assigning the same secondary link with a higher bandwidth, by assigning different secondary links each with a narrower bandwidth to different non-AP MLDs, reduces the collision on the secondary link when using the procedure in element 2 by different non-AP MLDs, and reduces padding overhead for end alignment with PPDU1 on primary link. (c) The AP MLD may allocate multiple secondary links to a non-AP MLD. (c)(i) If non-AP MLD accessing one of the link2 (secondary link) using procedures in element 2 and experiences no response/collision, it may re-attempt access on a different secondary link using procedures in element 2.

(48) A non-AP MLD starting a TXOP on link1 (primary link) may send a frame f on link2. (a) If the non-AP MLD has NSTR link1 and link2 pair, then the start of the PPDU carrying frame f on link2 may have start alignment with the start of the PPDU on link1. (b) The frame f indicates a NAV that can be ignored by intra-BSS MLDs wishing to perform the procedure in 2, while the NAV preventing OBSS STAs occupying link2. (c) The AC/TID of the TXOP may only be mapped to link1.

(49) AP may announce or require UL ACs for UL TIDs mapped to link2/secondary/conditional link having TXOP limit 0 on link2 when performing end-alignment to a PPDU sent on link1. AP MLD may use a set of different EDCA parameters for an AC in down link on primary or secondary link but may require associated STAs to use a different set of EDCA parameters for the same AC and on the same link for uplink access.

4. Flow Charts

Figure 3A:
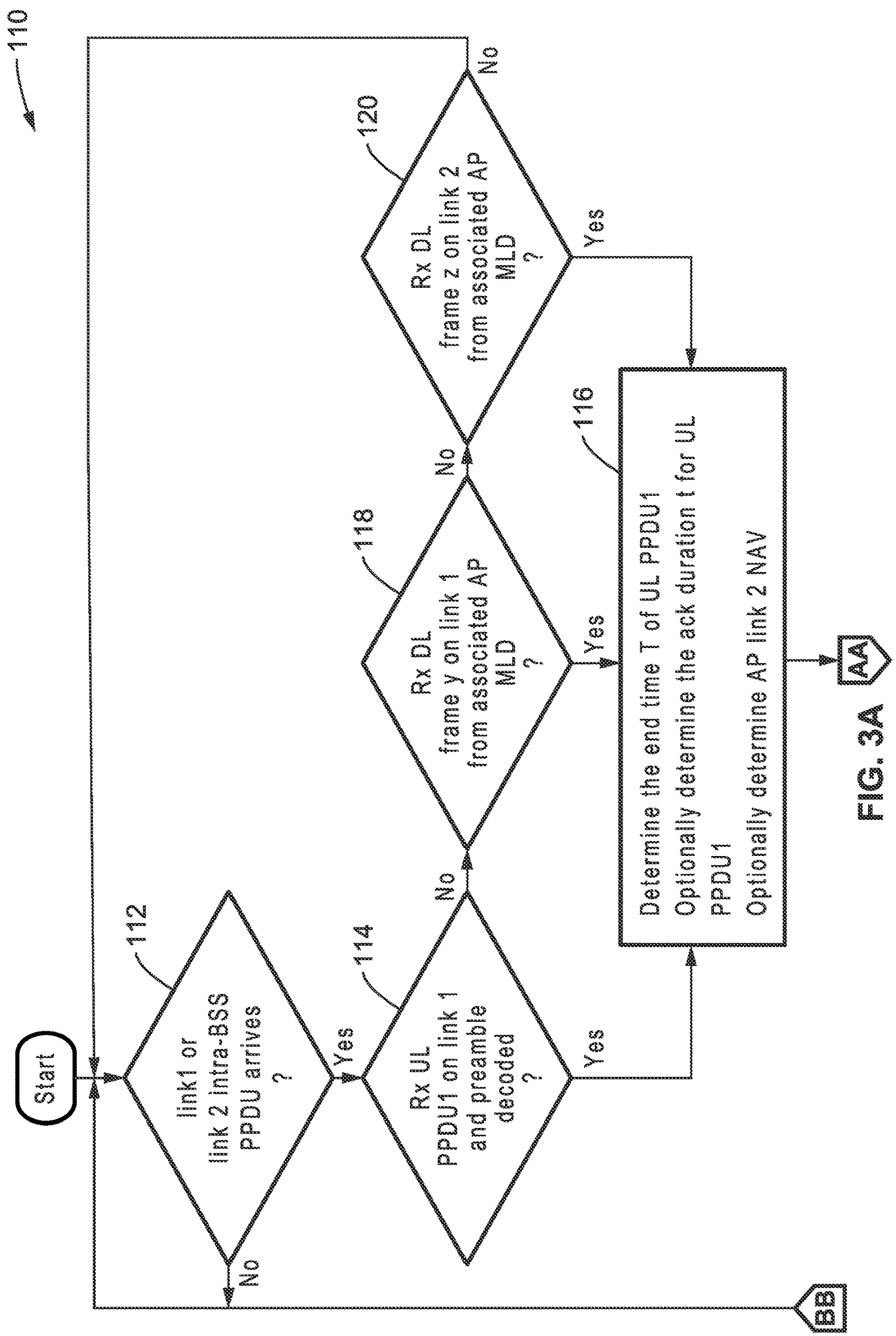
FIGS. 3A and 3B is a flow diagram of a non-AP MLD accessing Link2 when Link1 is occupied according to at least one embodiment of the present disclosure.
Figure 3B:
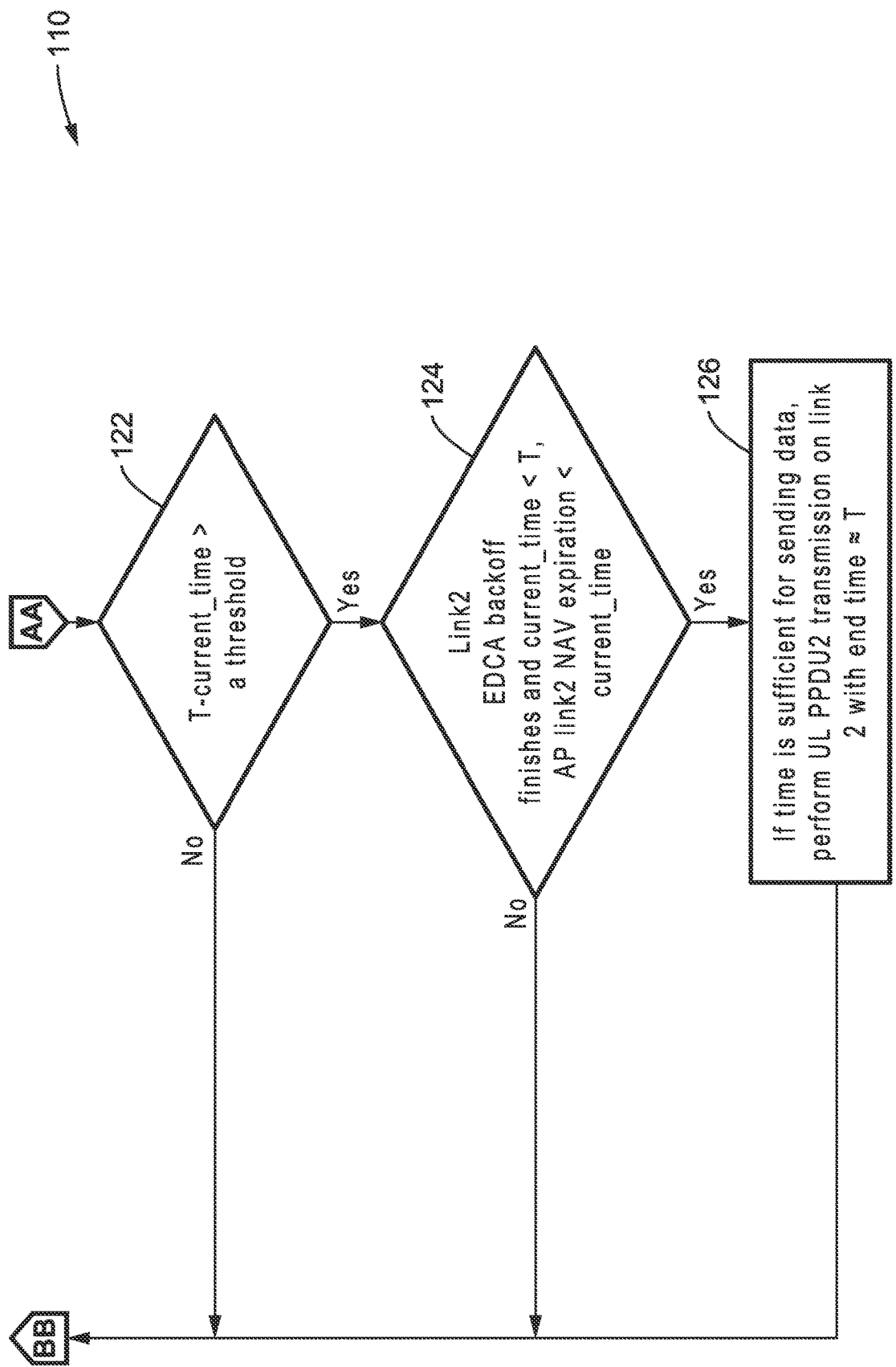

FIG. 3A and FIG. 3B illustrate an example embodiment of 110 of a non-AP MLD accessing link2 when link1 is occupied. The frames y and z are the DL frames on link1 and link2 immediately preceding the UL PPDU1, as described in element 2 and element 9 of Section 3, while the information carried in frames y and z is described in element 5 of Section 3.

A check 112 determines if the Link1 or Link2 intra-BSS PPDU has been received. If one of the links has not been received, then the check 112 is repeated. It should be appreciated that the repetition of check 112, and other such looping or other execution path control, is shown in these flow charts and other descriptions of the disclosed protocol in the context of boundary checks (e.g., event/timing constraints) which have not been shown for the sake of brevity of illustration.

Otherwise, when the link is received, a check 114 determines if the preamble of UL PPDU1 as received on Link1 could be decoded. If the condition is met, then execution reaches block 116 which determines the end time "T" of the UL PPDU1, while it can optionally: (a) determine the ACK duration "t" for the UL PPDU; and/or (b) determine the AP Link2 NAV.

If the condition of block 114 is not met, then execution reaches block 118 which determines if a DL was received with frame y on Link1 from an associated AP MLD. If the condition is met, then execution moves to block 116. Otherwise, execution reaches decision block 120 which determines if a DL frame z on Link2 has been received from the associated AP MLD. If the condition is met, then execution reaches block 116. Otherwise, execution returns back to block 112.

Execution moves from block 116 to block 122 of FIG. 3B which determines if the T-current time is greater than the allowed threshold, and in block 124 (a) if the Link2 EDCA backoff finishes with the current_time less than T, and (b) the AP Link2 NAV expiration being less than the current time.

If either condition is not met, then execution returns to block 112 in FIG. 3A, otherwise at block 126 if there is sufficient time for sending data, then a UL PPDU2 transmission is performed on Link2 with an end time of T.

Figure 4A:
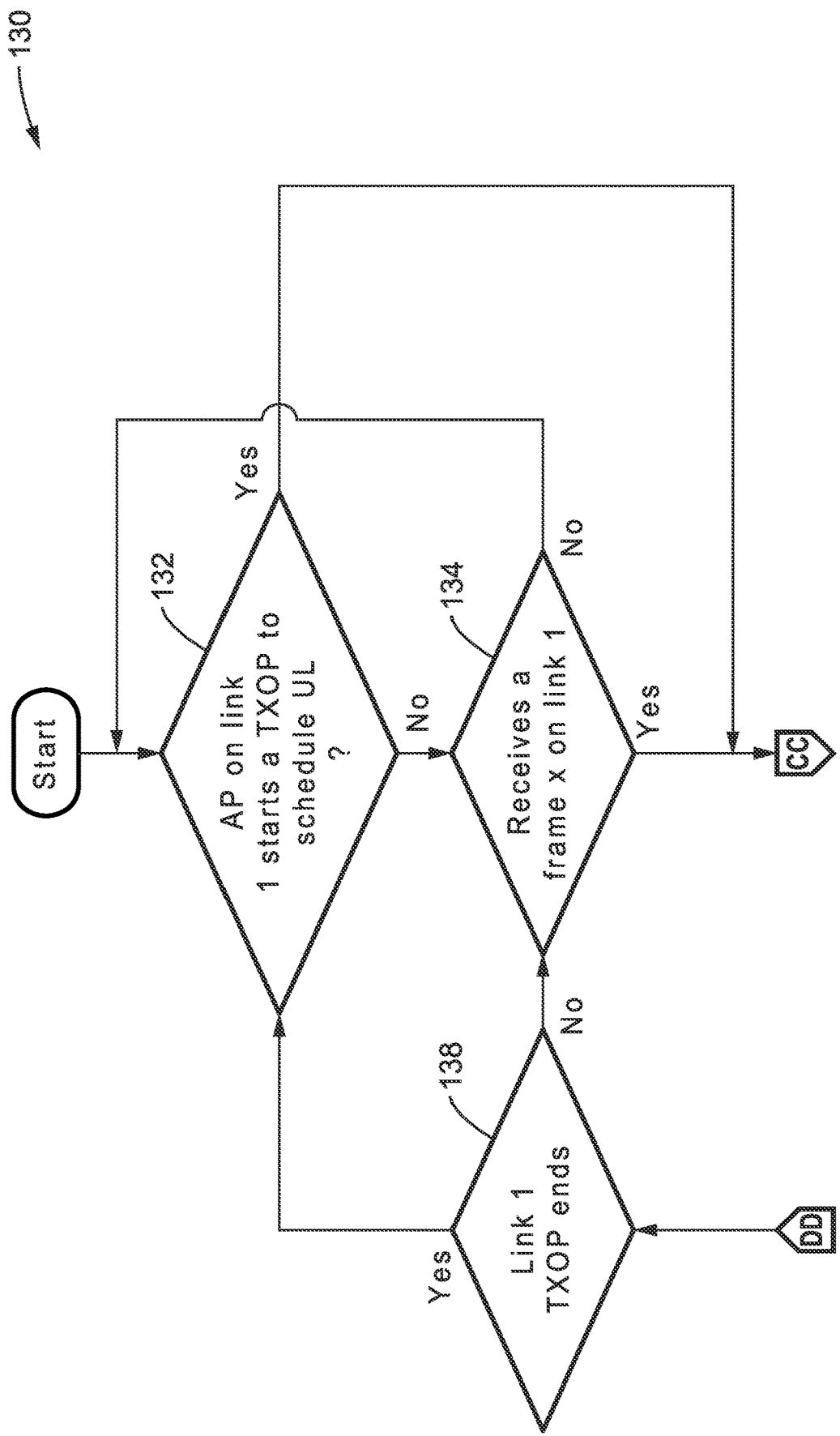
FIGS. 4A and 4B is a flow diagram of a soft-AP MLD assisting the access on Link2 when Link1 is occupied according to at least one embodiment of the present disclosure.
Figure 4B:
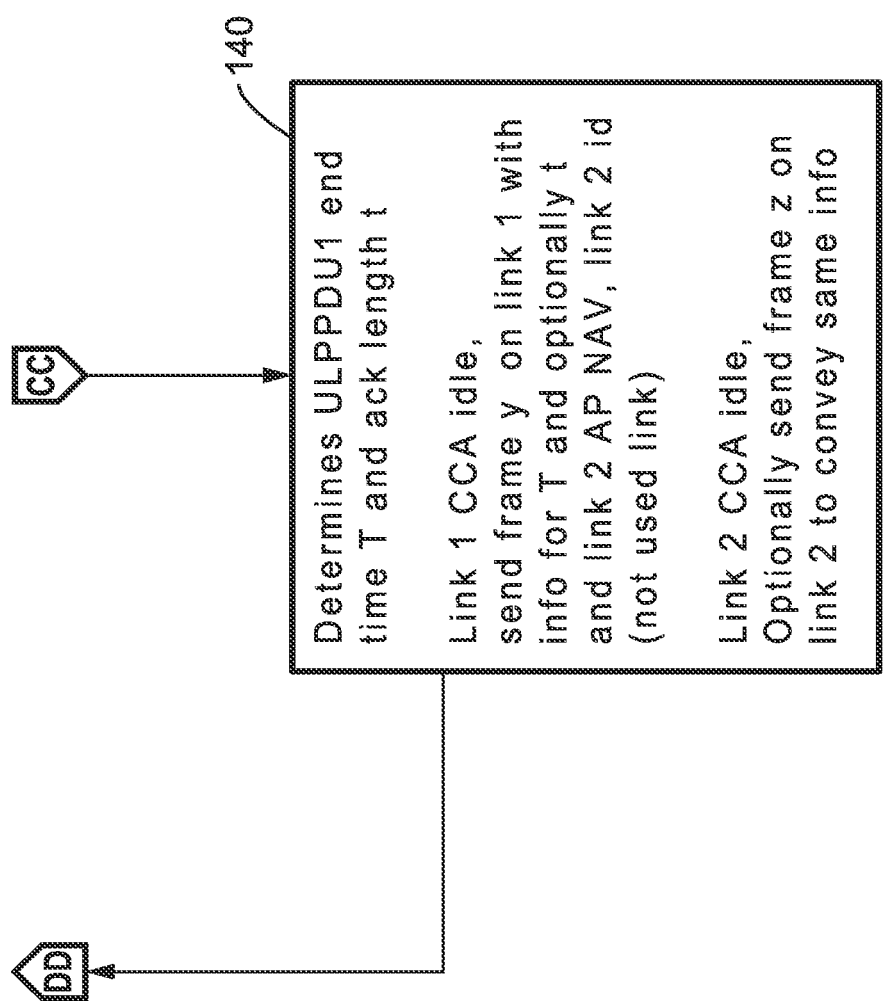

FIG. 4A and FIG. 4B illustrate an example embodiment of 130 of a soft-AP MLD assisting the access on Link2 when Link1 is occupied. The frame x is the UL frame on Link1 immediately preceding the frames y and z on Link1 and Link2, as described in description element 4c in Section 3. The info carried in frame x is described in description element 6 in Section 3.

In block 132 it is determined if the AP on Link1 has started a Transmit Opportunity (TXOP) to schedule an UL. If the condition is met and it has started the TXOP to schedule a UL, then execution moves to block 140 in FIG. 4B.

Otherwise, if the TXOP has not started, as determined at decision block 132, then execution reaches block 134 which checks if a frame x has been received on Link1. If the condition is not met, then execution returns to block 132. Otherwise, if the condition is met and frame x was received on Link1, then execution moves to block 140 in FIG. 4B which (a) determines UL PPDU1 end time T and ACK length t; (b) with Link1 idle it sends frame y on Link1 with information for end time T, and optionally t and Link2 AP NAV, and the Link2 identification for this unused link; and (c) with Link2 CCA idle, frame z is optionally sent on Link2 to convey the same information except for frame w instead of frame x. After this check 138 is performed in FIG. 4A to determine if the Link1 TXOP has ended. If the TXOP has ended, then execution moves to block 132; otherwise, it moves to block 134.

Figure 5:
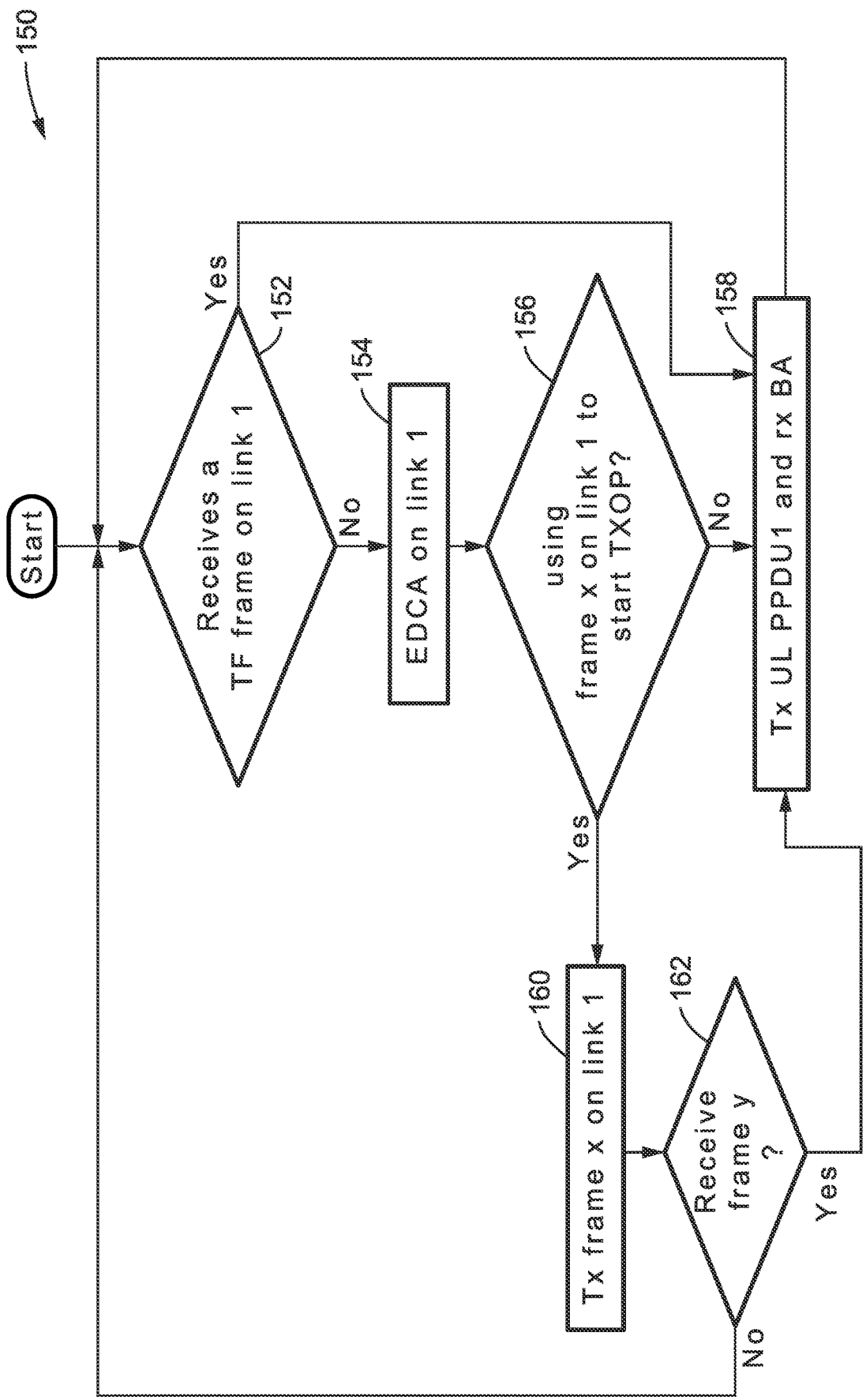
FIG. 5 is a flow diagram of sender operations for a UL PDU1 according to at least one embodiment of the present disclosure.

FIG. 5 illustrates an example embodiment of 150 of sender operations for an UL PPDU1. The frame x is the UL frame on Link1 immediately preceding the frames y and z on Link1 and Link2, as described in description element 4c in Section 3. The information carried in frame x is described in descriptive element 6 in Section 3.

In this process a check is made 152 to determine if the sender has received a Trigger Frame (TF) on Link1. If the condition it met, then execution moves to block 158. Otherwise, with no TF received, block 154 performs an Enhanced Distributed Channel Access (EDCA) on Link1, before reaching check 156 which determines if the sender is using frame x on Link1 to start a Transmit Opportunity (TXOP).

If at check 156 it is determined that frame x on Link1 is not being used to start a Transmit Opportunity (TXOP) then at block 158 the sender transmits an UL PPDU1 and receives the associated block acknowledgement(s) (BA), before execution returns to block 152.

Otherwise, if it is determined at block 156 that the sender is using frame x on Link1 to start a TXOP, then execution reaches block 160 with the sender transmitting frame x on Link1, after which check 162 determines if the sender has received frame y. If frame y has been received, then execution also goes to block 158, otherwise a direct return to block 152 is performed.

5. Examples of Access Operations 5.1. Soft AP UL Access Problem

Figure 6:
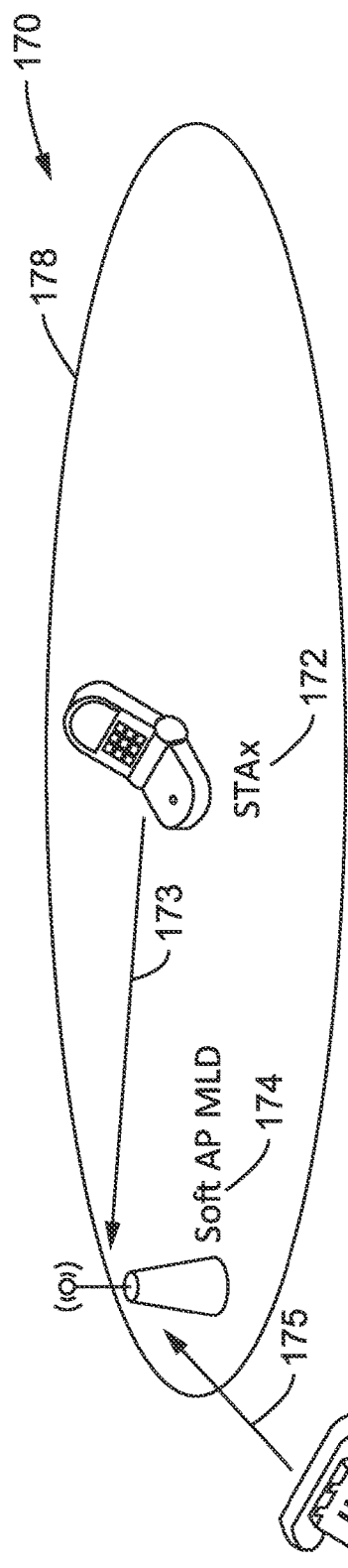
FIG. 6 is a topology diagram for use in explaining the soft AP UL access problem according to at least one embodiment of the present disclosure.

FIG. 6 illustrates an example topology 170 for explaining the soft AP UpLink (UL) access problem. A Multi-Link Device (MLD) 174, as a soft AP MLD (MLD1) monitors the basic link173 with STAx 172, within a range 178 for STAx.

MLD2 176 is seen connected on conditional link175. The range 178 may or may not cover the MLD2 which also monitors the basic link173.

The soft AP MLD is operating on both basic and conditional links. Soft AP MLD AP1 is operating on basic link associated with STA x, while Soft AP MLD AP2 is operating on the conditional link, for example in communicating with MLD2 STA2.

The AP MLD may be either a Simultaneous Transmit/Receive (STR) or a non-STR (NSTR) MLD operating on the basic/conditional link pair. The AP MLD is a soft AP MLD if it is a non-STR (NSTR) MLD operating on the basic/conditional link pair. If this is an STR MLD then it can transmit (TX) on a first link while receiving (RX) on another link of the link pair. If this is an NSTR MLD, then it cannot TX on a first link while receiving on another link of the link pair.

When STA x accesses soft AP MLD, as a non-STR MLD, on the basic link then MLD2 would not be able to access the soft AP MLD on the conditional link while the basic link is busy.

5.2. Soft AP UL Access on Conditional Link Only

When the basic link has an ongoing UL access to the soft AP MLD2 affiliated with a non-AP NSTR/STR MLD2 having newly arrived latency-sensitive traffic, may perform an EDCA access on the conditional link if it can end-align this with the current PPDU transmission taking place on the basic link.

Figure 7:
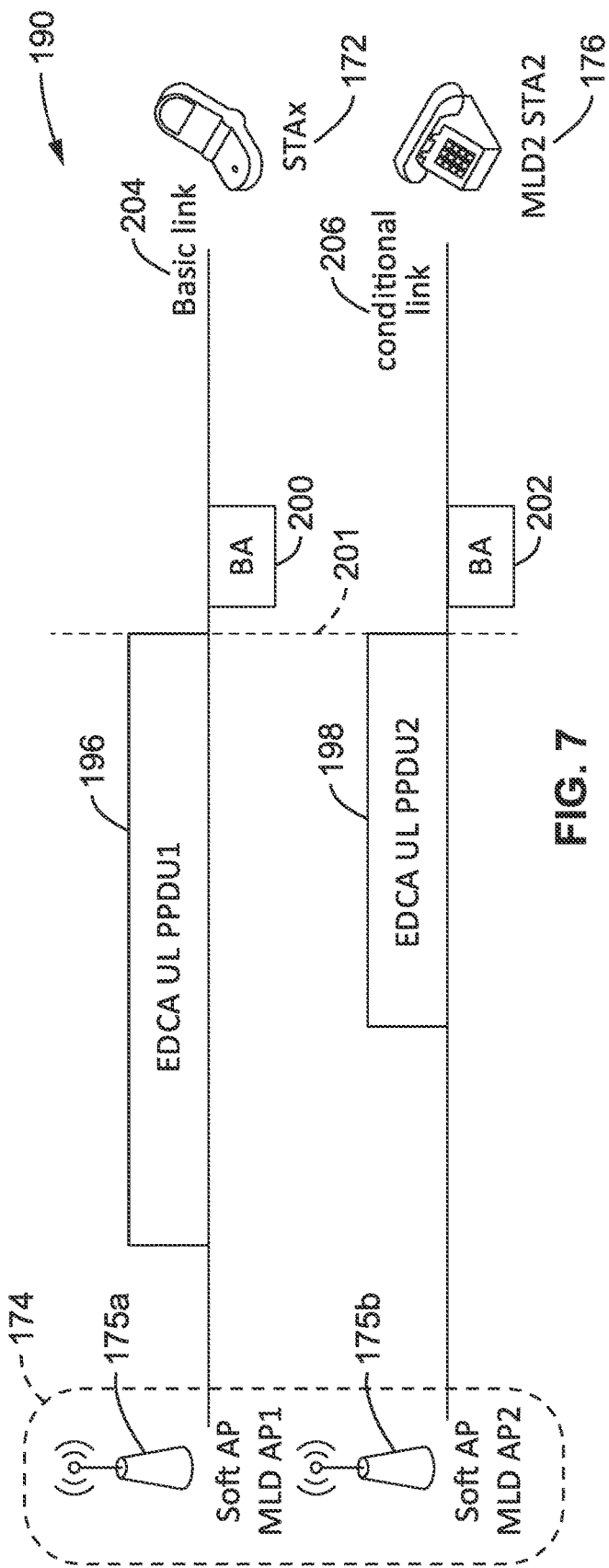
FIG. 7 is a communication diagram of a first case of soft AP UL access on a conditional link according to at least one embodiment of the present disclosure.

FIG. 7 and FIG. 8 illustrate examples 190 and 210 of a first (Case (1)) and second case of UL access on the conditional link only, for STA2, the STA affiliated with the conditional link, in MLD2 176 in the topology shown in FIG. 6.

In FIG. 7 is depicted a first case 190 of soft AP UL access with end aligned PPDU on the conditional link only. The figure depicts a communication shown as an EDCA UpLink (UL) PPDU1 196 over basic link 204 from STAx 172 to AP1 175*a* of soft AP MLD 174. In this scenario, during uplink on the basic link, STA2 of MLD2 176 performs uplink EDCA UL PPDU2 198 to AP2 175*b* over the conditional link206. In this first case MLD2 bases the STAx preamble on the basic link and CCA of the conditional link to access the conditional link. The PPDU 198 on the conditional length is started so as to be completed at the same time 201 as transmission 196. AP1 and AP2 then send Block Acknowledgements (BAs) 200 and 202.

It should be noted that Case (1) (first case) will not operate properly if the MLD2 cannot receive (hear) from STAx on the basic link.

In FIG. 8, the second case 210 of soft AP UL access on the conditional link is shown. In this case MLD AP1 175*a* of soft MLD 174 transmits a Trigger Frame (TF) 212 on the basic link 204, which starts NAV 216 as shown. At this time the conditional link is CCA idle. STAx 172 receives the TF 212, and commences a trigger based (TB) UL PPDU1 214 to MLD AP1. During the UL on the basic link, the conditional link206 becomes active with MLD2 STA2 176 transmitting an EDCA UL PPDU2 218 to MLD AP2, at a time determined so that the end of EDCA UL PPDU2 281 will end simultaneously with the end of TB UL PPDU1 214. In response to these uplinks, MLD AP1 and AP2 send block acknowledgements 220 and 222.

It should be noted in both case 190 and 210 that MLD2 is performing EDCA on both links, and that the basic link STA affiliated with MLD2 does not need to perform blindness recovery on basic link after the transmission on conditional link because the BA on the basic link synchronizes the NAV. In blindness recovery, there is a time duration that a NSTR MLD cannot transmit on Link1/basic link after it finishes transmission which occurred only on Link2/conditional link, because it cannot receive NAV information on Link1 when transmitting on Link2. It should be noted that in the above example STAx, MLD2 STA2 are affiliated with different devices. It should be noted that Case 210 (second case) will still operate properly if the MLD2 cannot receive (hear) from STAx on the basic link 5.3. Case (1) with RTS/CTS on Basic Link FIG. 9 and FIG. 10 illustrates 230 and 250 examples of Case (1), as was shown in FIG. 7, but using RTS/CTS on the basic link.

In FIG. 9 is seen an example topology 230 with a soft AP MLD 234 performing RTS/CTS 238 and 240 over a basic link with STAx 236 which has a transmission range 232 that in this scenario does not encompass (reach) STA2 associated with MLD2 242, whereby only CTS 240 is shown received at MLD2.

The communication 250 is seen in FIG. 10 with soft AP MLD 234, having AP1 235*a* and AP2 235*b*. MLD AP1 235*a* receives a Ready-To-Send (RTS) 252 from STAx 236, for which it transmits a Clear-To-Send 254, the CTS commences NAV 256.

However, this RTS 252 is not received by MLD2 242, as it is out of range 232 of STAx 236 transmissions, because MLD2 has received a CTS 254, but no Transmitter Address (TA) 255 in CTS frame indicating AP MLD as transmitter, so MLD2 cannot determine there would be an intra-BSS UL PPDU1 following the CTS frame.

On basic link266, upon receiving CTS 254 STAx transmits an UpLink as EDCA UL PPDU1 258. MLD2 would not be able to determine UL PPDU1 as an intra-BSS UL PPDU and cannot determine the end of the UL PPDU1 as MLD2 is out of range from STAx. So, the transmission of EDCA UL PPDU2 260 with end alignment to UL PPDU1, and the responding BA 264 is not possible.

For case (1) if MLD2 cannot hear (i.e., receive communications from) STAx, then the RTS/CTS communicated on the basic link may not be beneficial because: (a) MLD2 cannot derive PPDU length of UL PPDU1 from the NAV of CTS; and (b) CTS does not have a transmitter address (TA). So MLD2 cannot conclude the CTS is from the associated soft AP MLD.

5.4. Soft AP Basic Link Alternative RTS/CTS

Figure 12:
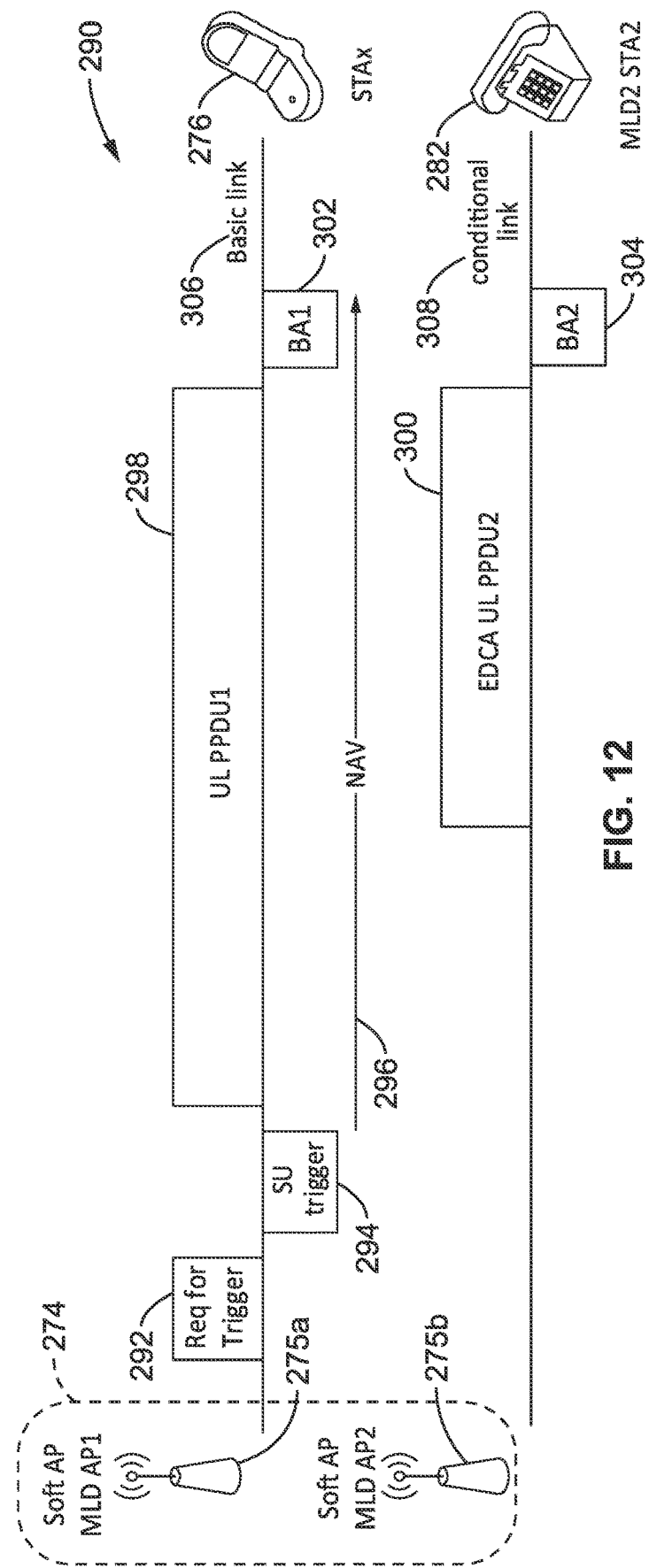
FIG. 12 is a communication diagram of a basic link using a Request For Trigger (RFT) frame as an alternative to RTS/CTS according to at least one embodiment of the present disclosure.

FIG. 11 and FIG. 12 illustrates 270 and 290 examples of Case (1), but using a Request for Trigger (RFT) frame on the basic link, instead of RTS/CTS.

In FIG. 11 is seen an example topology 270 with a soft AP MLD 274 performing RFT 278 and SU TF 280 over a basic link with STAx 276 which has a range 272, that in this scenario does not encompass MLD2 282, whereby only SU TF is shown received at MLD2.

In FIG. 12 is seen the communication 290 using a Request for trigger 292 (as an alternative to RTS/CTS) sent by STAx 276 on basic link 306. STAx uses a Request for Trigger (RFT) frame as an alternative to RTS. The frame in this RFT can be in a non-HT format with NAV readable by all; and the frame can indicate PPDU duration and expected BA1 duration.

AP1 replies with a Single User (SU) Trigger frame (TF) 294 on basic link 306 to STAx 276. The SU TF frame having one or more of the following characteristics: (a) it can be in a non-HT format, with the NAV readable by all; and (b) the frame indicates the UL PPDU1 duration and the expected BA1 duration; (c) the frame indicates which conditional link is not used; (d) the frame indicates the AP NAV of the conditional link(s) not used; (e) the frame provides an indication of whether the NAV on conditional link was caused by traffic which is not to/from AP; (f) the frame contains the soft AP basic link address as the Target Address (TA).

STAx after receiving SU TF starts UL PPDU1 298 on basic link 306. STA2 282 affiliated with MLD2 may perform EDCA access, depicted as EDCA UL PPDU2 300, on conditional link 308 with end time alignment: If (a) STA2 sees (i.e., receives/detects) SU trigger on the basic link which also indicates that the conditional link was not used. Then (b) STA2 may pad UL PPDU2 to satisfy end time alignment. (c) MCS, BW, number of TIDs, number of MPDUs in EDCA UL PPDU2 are selected by STA2 to satisfy BA2 length being less than or equal to BA1 length.

It will be appreciated that the ability to pad transmission (e.g., EDCA UL PPDU2) on conditional link 308 allows STA2 to start UL 300 at its discretion and pad the data as necessary to end at the same time as the transmission (e.g., UL PPDU1) on the basic link.

After these transmissions soft AP MLD AP1 and AP2 generate block acknowledgements (BA) 302 and 304, respectively.

5.5. Benefits and Limitations of Soft AP UL Access 5.5.1. Benefits

Figure 13:
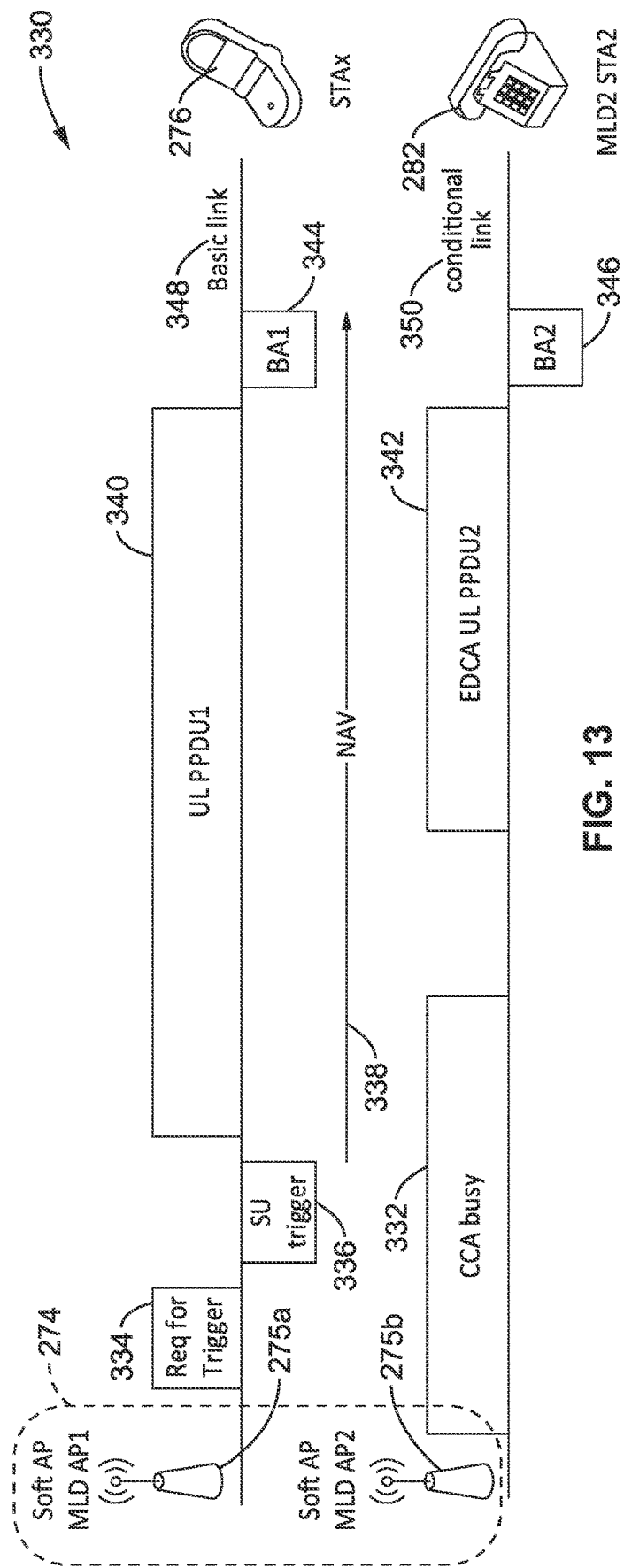
FIG. 13 is a communication diagram of pros and cons of using a RFT according to at least one embodiment of the present disclosure.

Soft AP UL access as described provides quick access on the conditional link, exemplified as by MLD2 STA2 if: (a) basic link is occupied by STAx of the same BSS; and (b) conditional link was busy when STAx started access, but it becomes idle later as illustrated in FIG. 13.

This approach can overcome (bypass) the blindness recovery issue on basic/conditional link after TX on conditional/basic link (for both soft AP MLD and a NSTR MLD2).

5.5.2. Limitations

The conditional link access as performed in this way has no hidden node protection.

5.6. Example of Frame w and z on Link2

Figure 14:
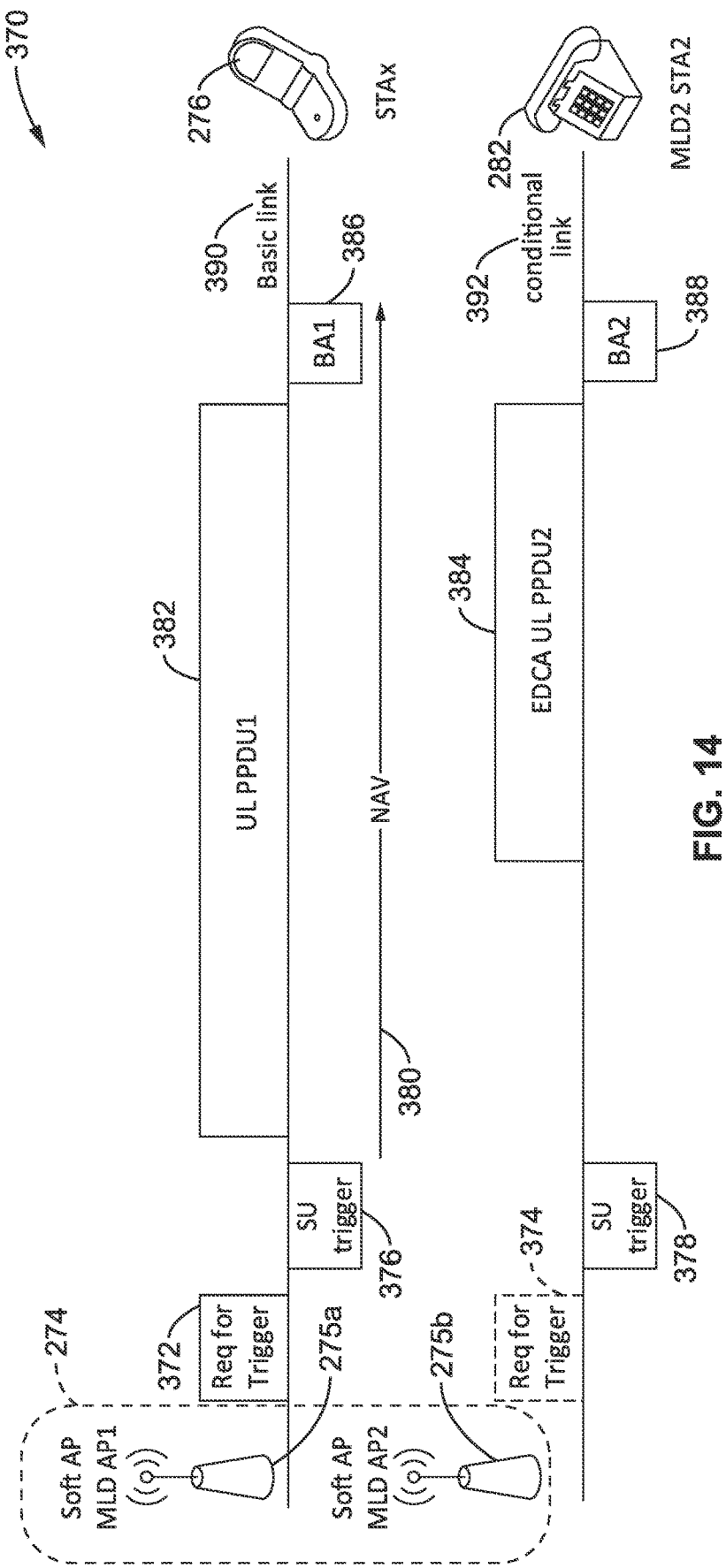
FIG. 14 is a communication diagram of frame w and z on Link2 utilized according to at least one embodiment of the present disclosure.

FIG. 14 illustrates an example embodiment 370 of frame w and z on Link2. The stations are the same as in the previous figure. STA1 may align the start/end time when sending Req for Trigger on basic and conditional links. STAx indicates which cond. link not used for access in Req for Triger (frames x and w), and UL PPDU/BA length.

Soft AP MLD may reply or SU trigger or send unsolicited SU trigger on all links (frames y and z), indicating the info such as: (a) UL PPDU/BA length from STAx; and (b) AP NAV on the conditional link if conditional link CCA busy.

For a conditional link, if the backoff counter is not already zero, the soft AP may use PIFS sensing for determining CCA idle before sending SU trigger on that link without waiting for the conditional link backoff countdown to 0.

A soft AP MLD 274, has AP1 275*a* communicating over basic link (Link1) 390 with STAx 276, and AP2 275*b* which communicates over conditional link (Link2) 392 with MLD2 STA2 282.

STAx 276 having a limited range generates RFT 372 over a basic link 390, which in this scenario does not encompass reaching MLD2. In response to the RFT, AP1 transmits SU Trigger 376 back to STAx. It will be noted, however, an unsolicited SU trigger 378 is sent by AP2 for providing information related to the UL PPDU1 which MLD2 may not hear.

STAx may only send RFT on the basic link with the above info. The Soft AP may reply with SU triggers on all links.

For conditional links, the soft AP can use PCF Interframe Space (PIFS) sensing for determining sending SU triggers on that link.

So, the figure depicts UL PPDU1 382 and EDCA UL PPDU2 384 ending at the same time after which BAs 386 and 388 are sent by MLD AP1 and AP2.

5.8. Example of Frame z on Link2

Figures 15, 16:
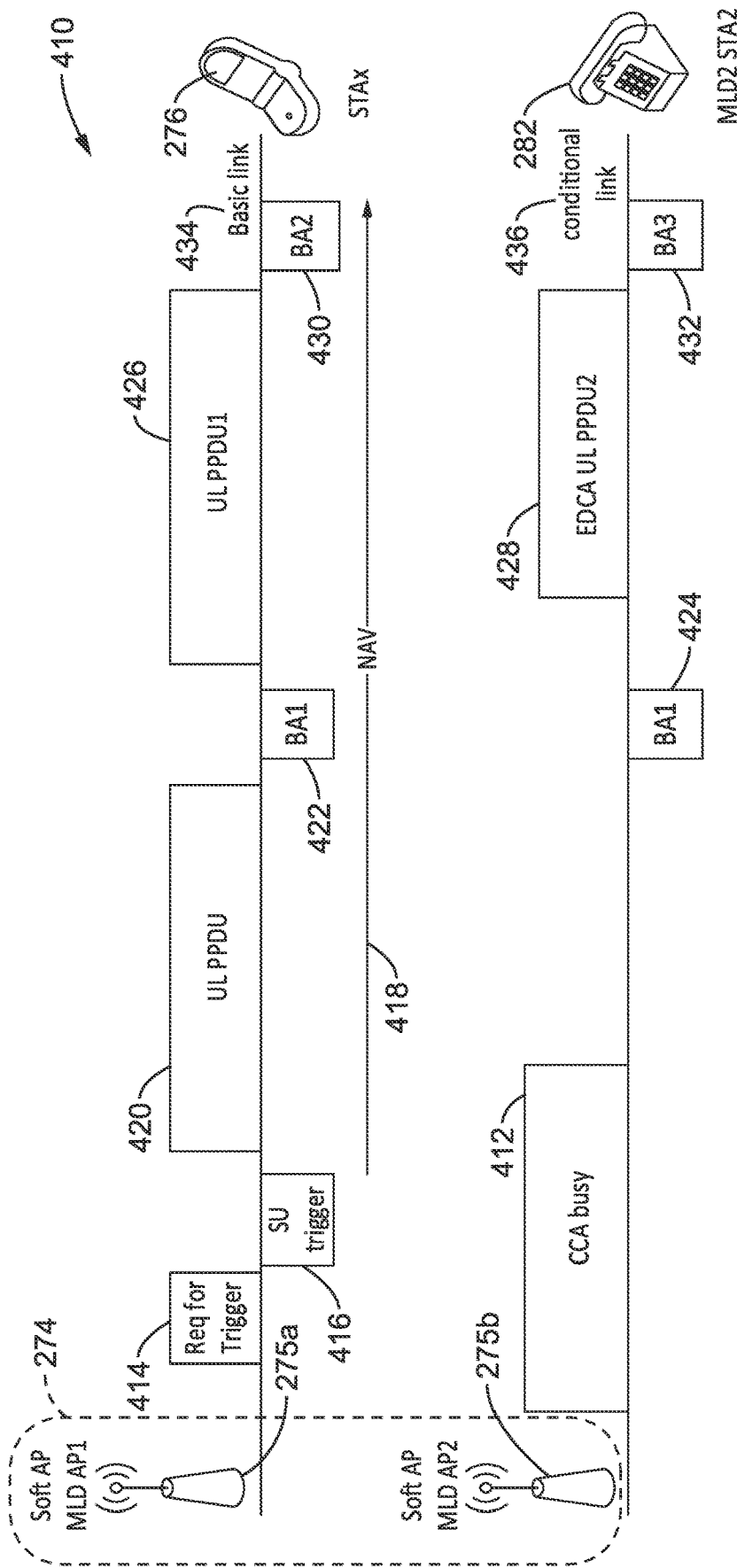
FIG. 15 is a communication diagram of frame z on Link2, when TXOP bursting is performed on the basic link, according to at least one embodiment of the present disclosure.
FIG. 16 is a data field diagram of a frame carrying x and w according to at least one embodiment of the present disclosure.

FIG. 15 illustrates an example embodiment 410 of frame z on Link2, when TXOP bursting is performed on the basic link, with CCA busy on conditional link at the beginning of the TXOP. It will be appreciated that the principle of TXOP bursting is to allow the station that wins (obtains) channel access to perform multiple packet transmissions, up to the maximum allowed duration of the burst.

The figure has the same stations as in the previous example, but in this case the conditional link 436 starts at CCA busy 412. On the basic link STAx 434 sends RFT 414, and receives SU trigger 416 from AP1, upon which it performs bursting with UP PPDU 420 and UL PPDU1 426. It will be noted that after UL PPDU 420 AP1 sends block acknowledgements BA1 422 424. Then MLD2 STA2 282 transmits EDCA UL PPDU 428 whose end coincides with UL PPDU1 426, and the soft AP sends block ACKs BA2 430 and BA3 432.

The info for the next PPDU/next BA (ULPPDU1/BA2) can be carried in BA1 on both basic and conditional links. BA1 transmission on the conditional link is based on PIFS sensing CCA idle on that link. Instead of sending BA1 on the conditional link, a frame different from BA1 can be sent on the conditional link, with possible padding to align the start/end with BA1

5.9. UL PPDU Length Threshold on Link1

If UL PPDU length is smaller than a threshold, then STAx may not send Req for Trigger (frame x) but may send UL PPDU1 directly.

If MLD2 STA2 hears (receives) an UL PPDU on basic link with a length less than a threshold, MLD2 STA2 may not be allowed to have EDCA access on the conditional link before the end of the PPDU and corresponding BA on basic link.

6. Example Communication Frames 6.1. Frame Format of Frame x and w

FIG. 16 illustrates an example embodiment 450 of the frame carrying x and w as was described in element 6 of Section 3. The frame may be an MPDU in an AMPDU in the ULPPDU1 to provide information of the next PPDU in the same TXOP. It should be appreciated that the field names, positions, other programmatic details of this and other fields described herein may be widely changed, and their functions combined or separated, without departing from the teachings of the present disclosure.

The frame in exemplified as having the following fields. A Frame Control (FC) field is followed by a Duration field carrying the value of the Network Allocation Vector (NAV), during which access to the medium is restricted. A Recipient Address (RA) field and Transmitter Address (TA) field are also included. The frame ends with a Frame Check Sequence (FCS). It will be noted that the FC, Duration, RA, TA, and TCS fields are present in many types of existing 802.11 frames.

An UpLink (UL) Length field indicates the length of the UL PPDU1. This information is used by an MLD accessing Link2 for aligning the end of its PPDU to the end of UL PPDU1 as mentioned in element 2 of Section 3.

A Block Acknowledgement (BA) length field indicates the length of the expected BA responding to the UL PPDU1 on Link1. This information is used by an MLD accessing Link2 for use in determining the characteristics of ULPPDU2 described in element 8 of Section 3.

An Occupied Link Bitmap field indicates the link, or links, which are expected to be occupied by the UL PPDU1. This information is used by an MLD in determining the identities of Link2 which is not going to be occupied by UL PPDU1.

6.2. Format of Frame y and z

Figure 17:
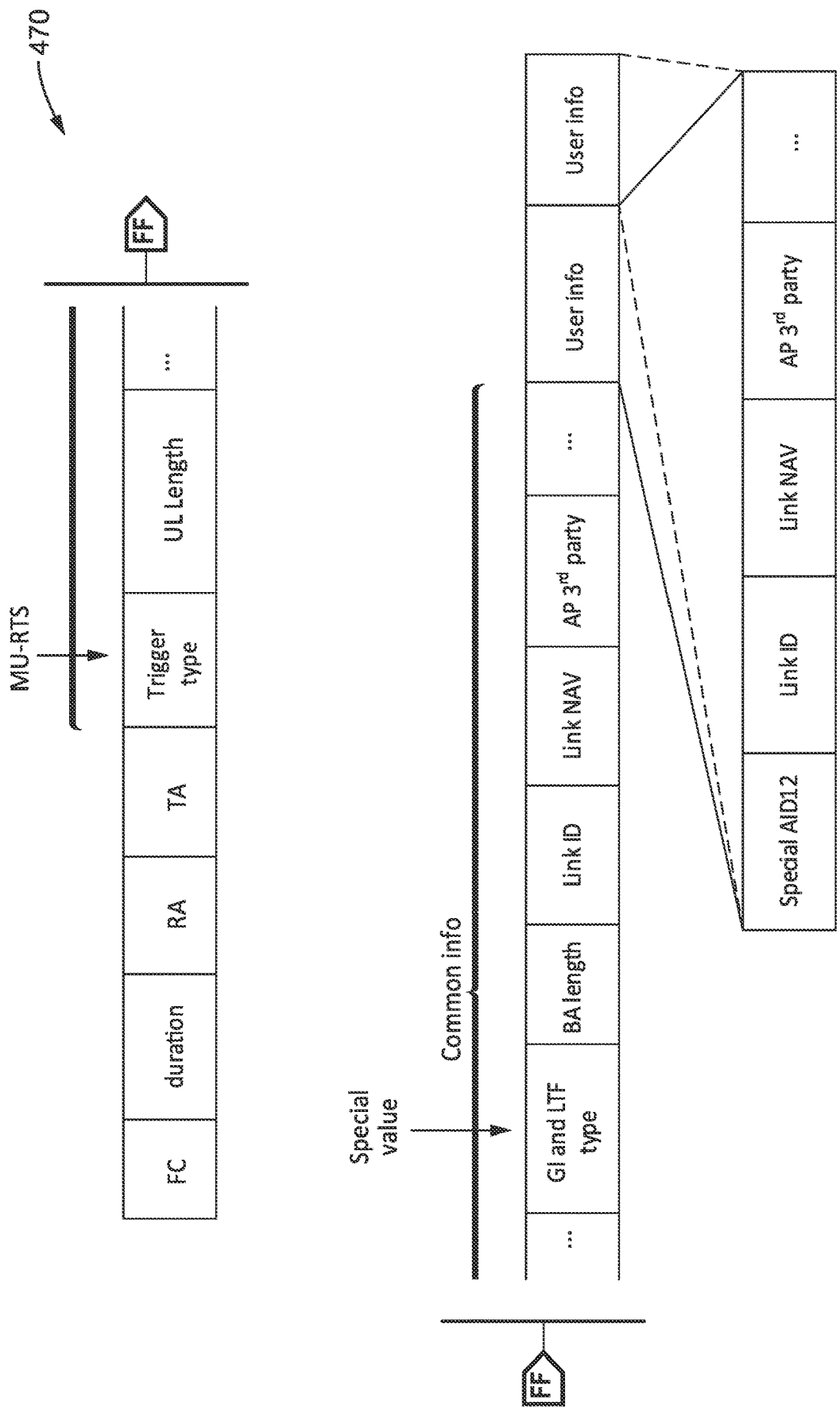
FIG. 17 is a data field diagram of a frame format for y and z according to at least one embodiment of the present disclosure.

FIG. 17 illustrates an example embodiment 470 of a frame format for y and z. The frame may be a variant of an MU-RTS. A Guard Interval (GI) and Long-Training Field (LTF) may be set to a particular value to identify the following fields being different from a typical MU-RTS frame. The non-AP MLD trying to access Link2 may use this info to determine the presence of the fields described below.

A TA field may be set to the identity of the AP MLD on Link1 or Link2 respectively, corresponding to the information in element 5c in Section 3. An RA field may be set to a broadcast address, or the address of the sender of UL PPDU1 on Link1. A Link ID field corresponds to the info in element 5d in Section 3, regarding the identity of Link2. The non-AP MLD may use this information to access Link2 as in element 2 and element 5d of Section 3.

A Link NAV field corresponds to the information in element 5e of Section 3, for instance Link2 NAV at AP MLD. A non-AP MLD trying to access Link2 may use this information to start the UL PPDU2 after Link2 NAV is idle.

An AP third party field corresponds to the information in element 5f of Section 3, such as whether Link2 NAV is set because AP MLD is a TXOP holder/responder on Link2, or a 3rd party.

If the information in element 5 of Section 3 needs to be reported for multiple links, for instance if there are multiple links satisfying the criteria to be Link2, then the additional information of element 5 of Section 3 for additional links can be reported in the later User info fields.

A special AID12 field at the beginning is used to identify the user information. A UL Length and BA Length fields are the same as described in the previous example frame format of frame x and w.

6.3. Frame Format of Frame y

Figure 18:
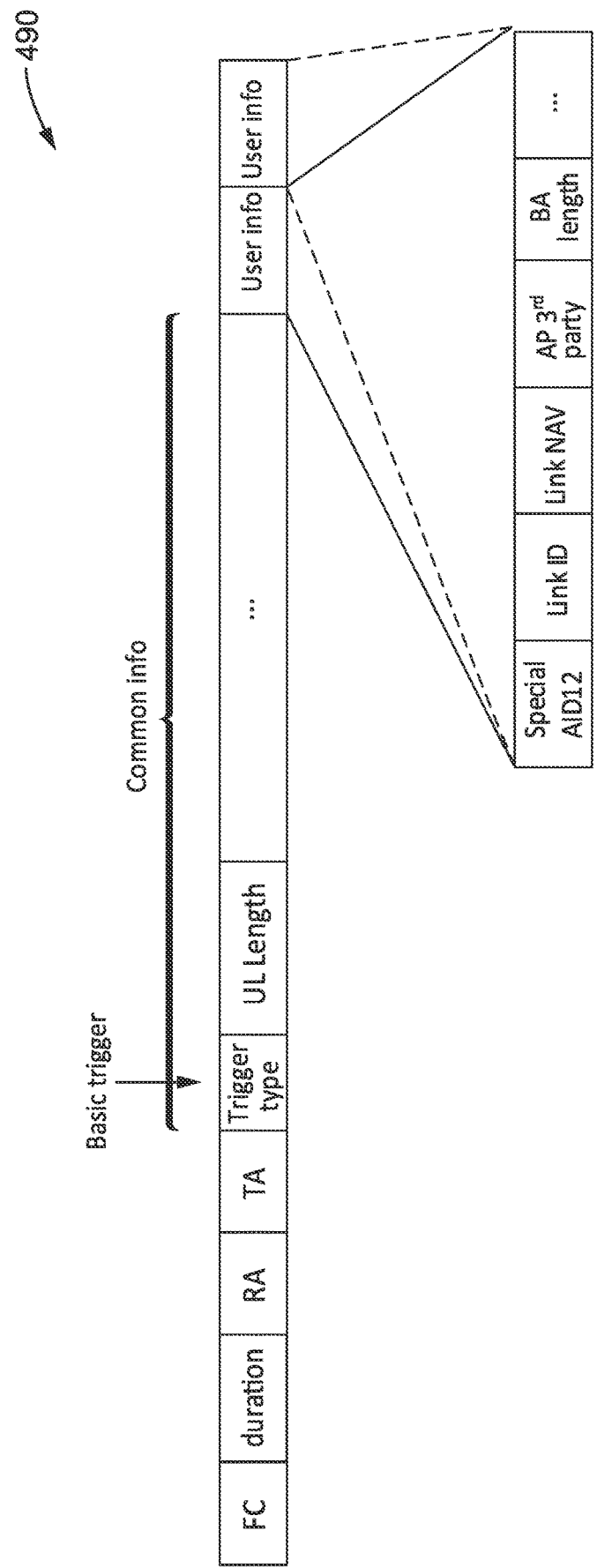
FIG. 18 is a data field diagram of a format for frame y according to at least one embodiment of the present disclosure.

FIG. 18 illustrates an example embodiment 490 of a format for frame y. The frame may be a variant of a basic trigger frame. A UL length information field as given in element 5a of Section 3 is already defined in the basic trigger. The user information field with a special AID12 may be used to identify the user information field to carry Link ID/Link NAV/AP 3rd party/BA length fields. The Link ID/Link NAV/AP 3rd party/BA length fields are the same as described in the previous example frame format of frame y and z.

6.4. Format of Frame y and z

Figure 19:
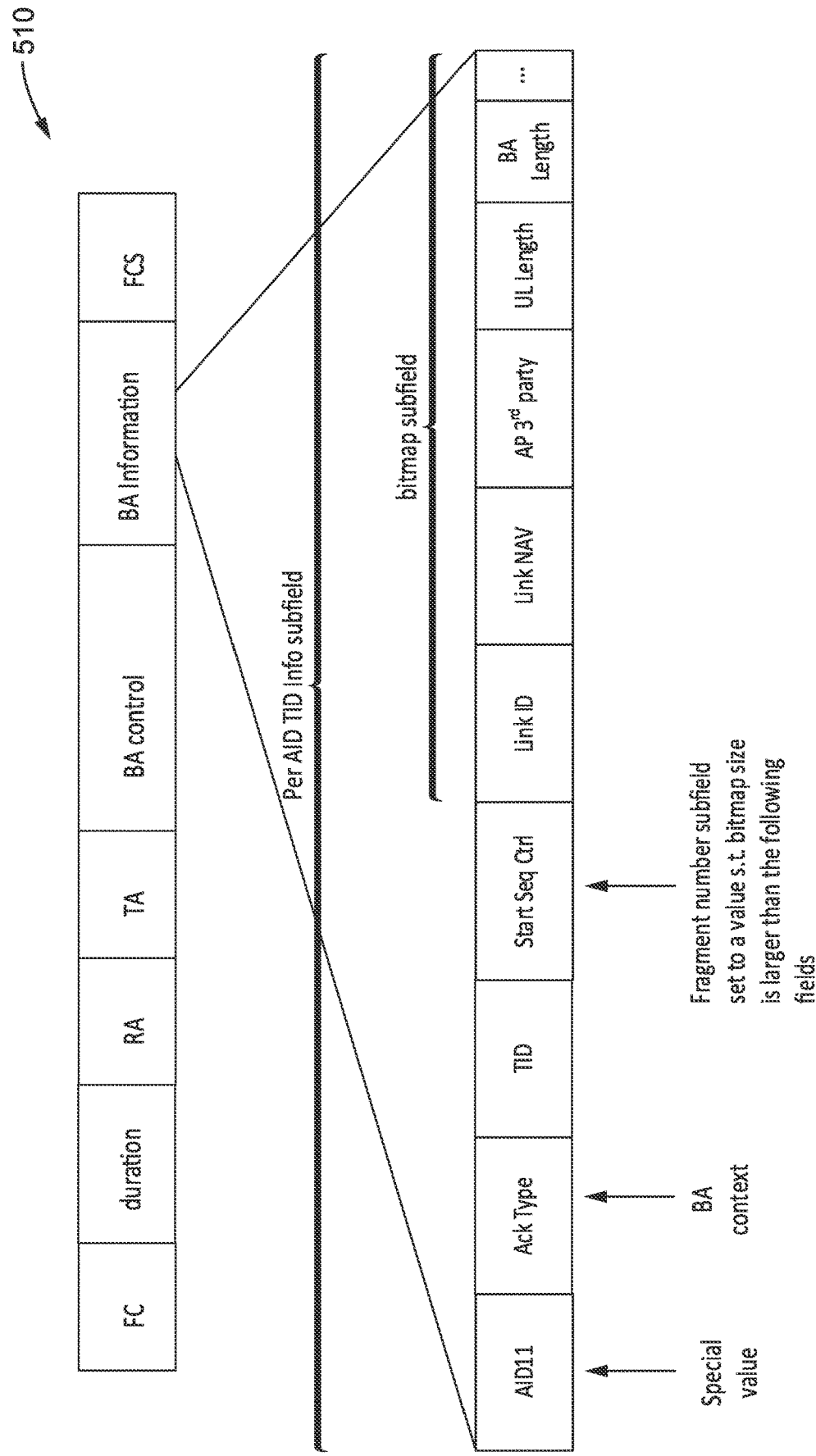
FIG. 19 is a data field diagram of a format for frame y and z according to at least one embodiment of the present disclosure.

FIG. 19 illustrates an example embodiment 510 of a format for frame y and z. The frame may be a variant of a Multi-STA Block ACK (BA) frame. The frame carries the information described in element 5 in Section 3, and has the following fields.

A TA field is set to the identity of the AP MLD on Link1 or Link2 respectively, corresponding to the information in element 5c in Section 3. An AID11 field is set to a special value to identify the bitmap subfield is used to carry Link ID/Link NAV/AP 3rd party/BA length fields. Link ID/Link NAV/AP 3rd party/BA length fields are the same as described in the previous example frame format of frame y and z.

The fragment number in Start Sequence Control is set to a value that defines a bitmap length which has sufficient size to carry the information as per element 5 of Section 3 (in this example: Link ID/Link NAV/AP 3rd party/BA length fields). A legacy STA may use the value to skip to the next Per AID TID Info subfield.

7. Additional Examples 7.1. Topology

Figure 20:
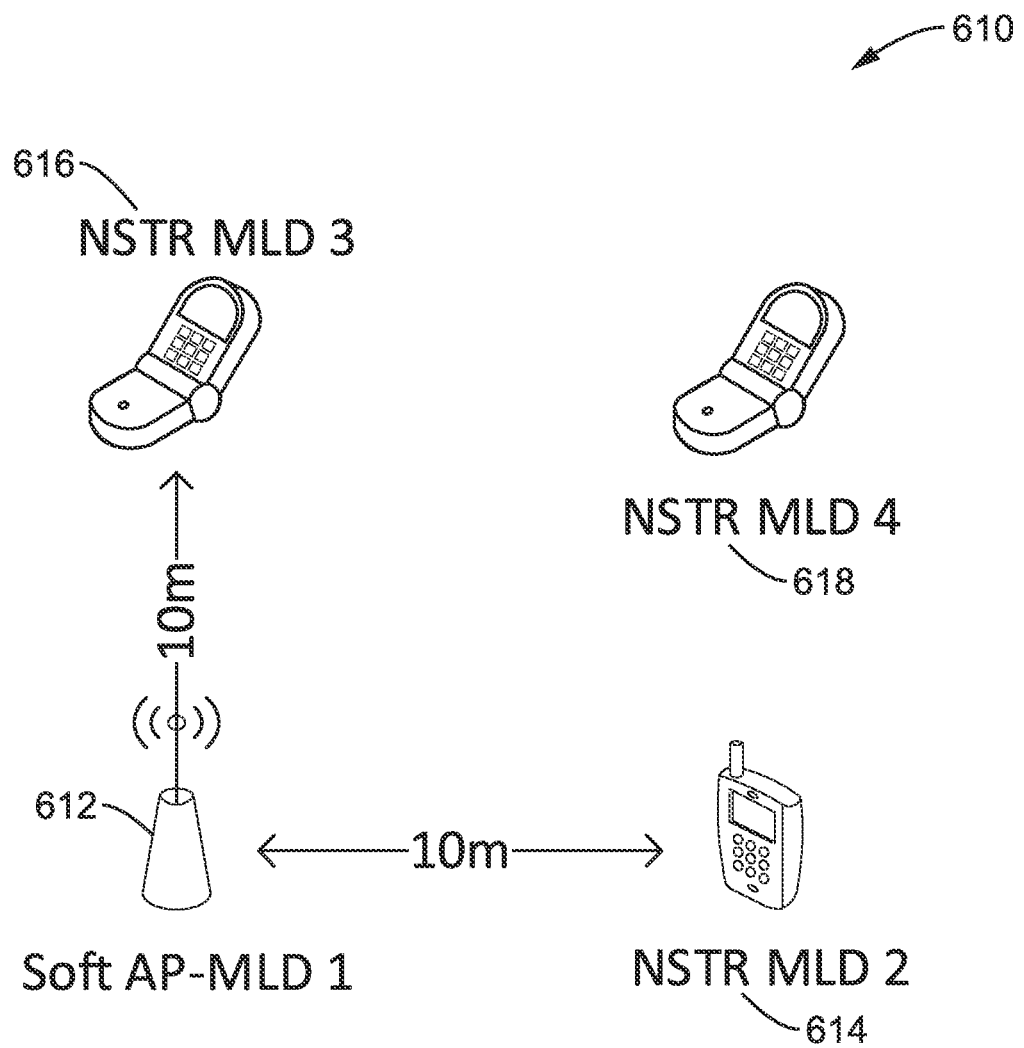
FIG. 20 is a topology diagram of an example single BSS for the simulations according to at least one embodiment of the present disclosure.

FIG. 20 illustrates an example embodiment 610 of a simulation topology in which MLD2 614, MLD3 616, MLD4 618 are associated with Soft AP MLD1 612. Two links are shown with a primary (Link1/Wifi1) and a secondary (Link2/Wifi2), each having an 80 MHz bandwidth (BW) with fixed MCS QPSK ¾ for Data, BPSK ½ for Block Acknowledgement (BA). Tested traffic sources for a MLD: were UL FTP source with 50 MB file (AC 0), and UL CBR source with 1400 B per ms (AC 3). The FTP/AC 0 TXOP limit was 5 ms. Distance between nearest STAs in this simulation being at 10 meters. It should be appreciated that these values are given by way of example and not by way of limitation for performing a simulation.

7.2. Scenario

In the tests delivered FTP traffic volume per source and CDF of CBR e2e delay are measured for a 5 second duration. Traffic sources MLD3 CBR, MLD2 FTP, MLD4 CBR.

Cases:

(1) baseline: baseline soft AP, secondary link can transmit only when the primary link transmits, for example start and end alignment for non-simultaneous transmit/receive (NSTR) non-AP MLD. Each Aggregated MAC Protocol Data Unit (AMPDU) can fit at most 12.4 KB (20 MPDUs).

(2) tlm: same as baseline but with AC0 mapped to primary link only, AC3 mapped to both primary and secondary links.

(3) tlm+ula_12.4: same as Um but allowing UL AC3 secondary link EDCA access when primary link has an intra BSS UL PPDU, i.e., UL end-alignment for different MLDs.

(4) tlm+ula_6.2: same as tlm+ula_12.4 but each AMPDU fits at most 6.2 KB (10 MPDUs).

(5) tlm+ula_3.1: same as tlm+ula_12.4 but each AMPDU fits at most 3.1 KB (5 MPDUs).

7.3. Results

Figure 21:
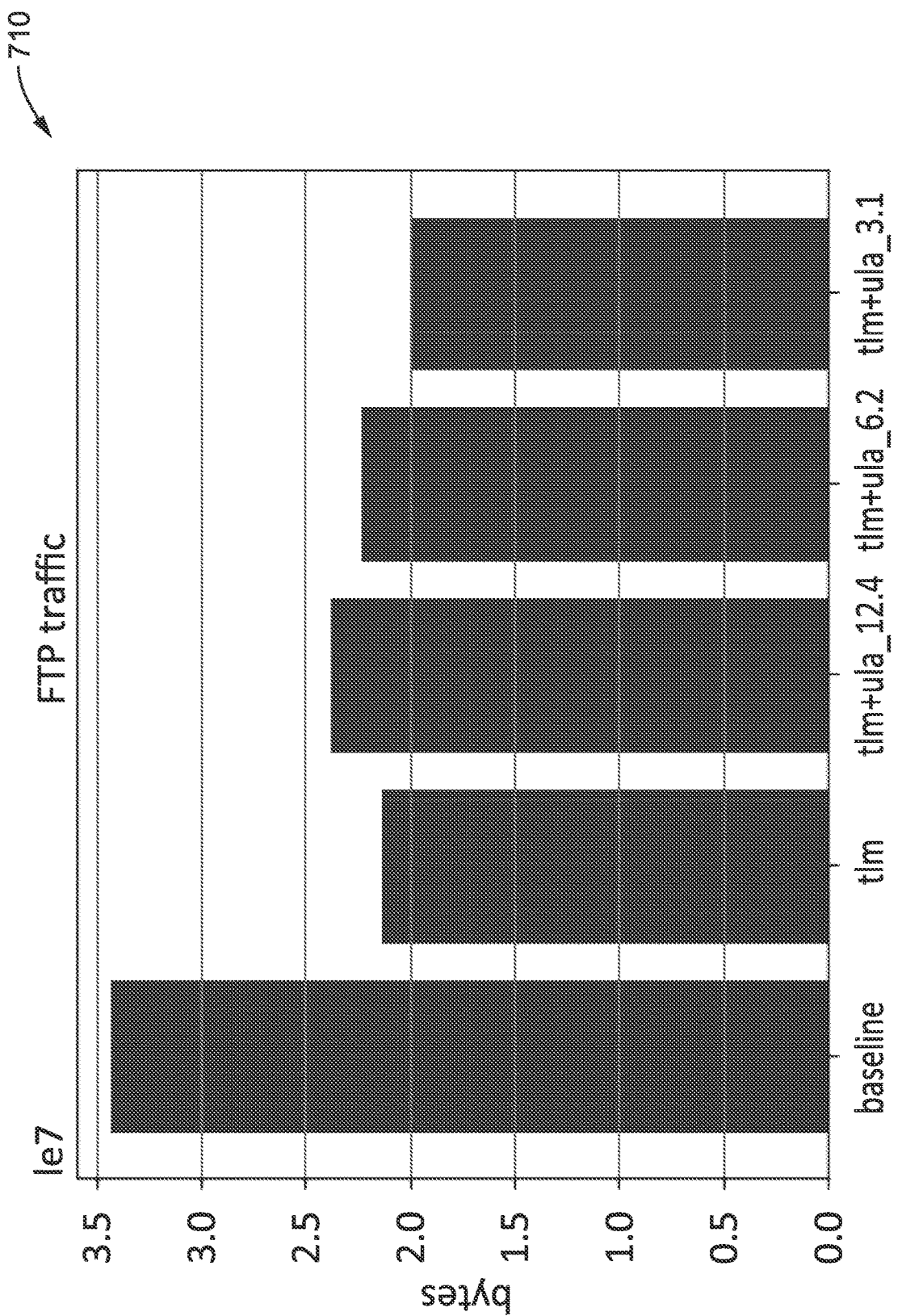
FIG. 21 is a bar graph per source STA of FTP traffic results for the five cases of the single BSS scenario 3 as was shown in FIG. 20 according to at least one embodiment of the present disclosure.
Figure 22:
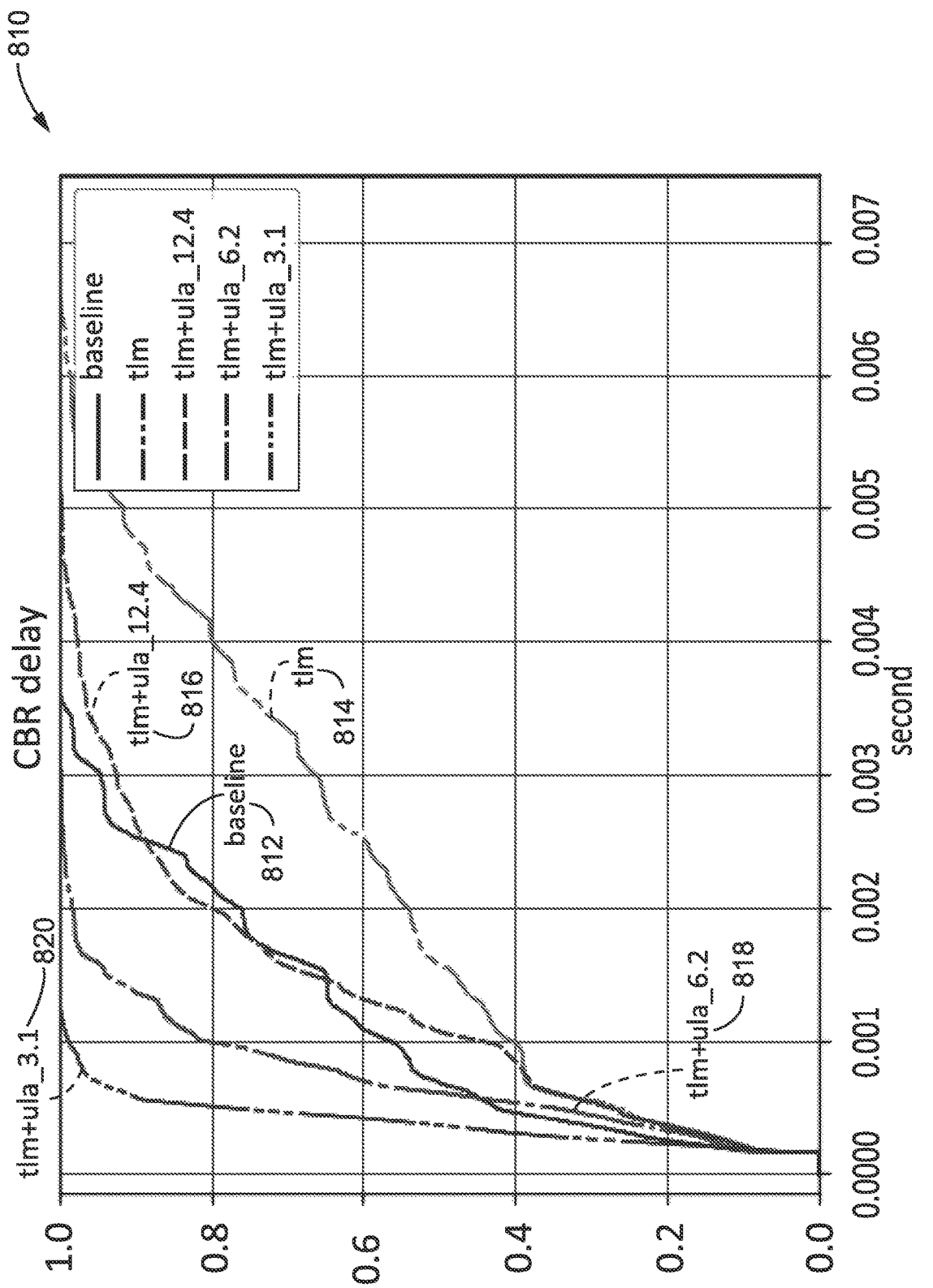
FIG. 22 is a plot of CBR delay for the five cases of the single BSS scenario 3 shown in FIG. 20 according to at least one embodiment of the present disclosure.

FIG. 21 and FIG. 22 illustrate simulation results 710 and 810 that show improved delay performance of tlm+ula_3.1 and tlm+ula_6.2 compared to baseline case and tlm, while there are penalties to the FTP throughputs compared to the baseline case. The tradeoff between delay performance and FTP throughput comes from Section 3 element 32 by only mapping FTP to the primary link. However, only applying element 32 by giving less bandwidth to FTP, the improved delay is not possible as seem in case Um (case without link2 end-alignment with link1). That is, the improved delay performance comes from a combination of element 32 and end-alignment from different MLDs. Also observed is that a smaller PPDU size as described in Section 3 element 31 further helps to reduce delay (i.e., tlm+ula_3.1 delay<tlm+ula_6.2 delay<tlm+ula_12.4 delay with the same duration of primary link TXOP) without significant further penalty of FTP throughput. That is, AP may adjust PPDU duration based on Section 3 element 31 to target a specific delay bound of latency sensitive traffic.

7.4. Additional Communication Examples

Figure 23:
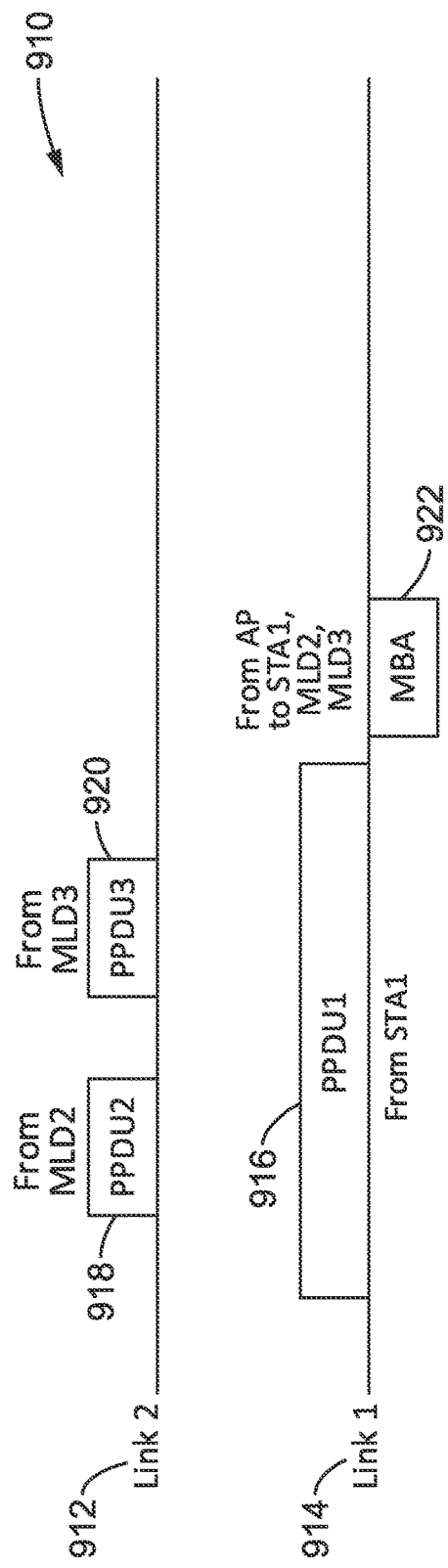
FIG. 23 is a communication diagram of multiple MLDs accessing link2 without end-alignment according to at least one embodiment of the present disclosure.

FIG. 23 illustrates an example embodiment 910 of Section 3 element 40 in which MLD2 and MLD3 are accessing link2 without end-alignment.

The figure depicts a link1 914 (primary link) and a link2 912 (secondary link). A PPDU1 916 is seen being sent from STA1 on link1, and a PPDU2 918 from MLD2, after which PPDU3 920 from MLD3, both sent on link2. The ACK or Block Ack (BA) for these multiple PPDUs, exemplified as PPDU1, PPDU2 and PPDU3 are shown being sent on link1 as a Multiple-STA Block Ack (MBA) 922.

Figure 24:
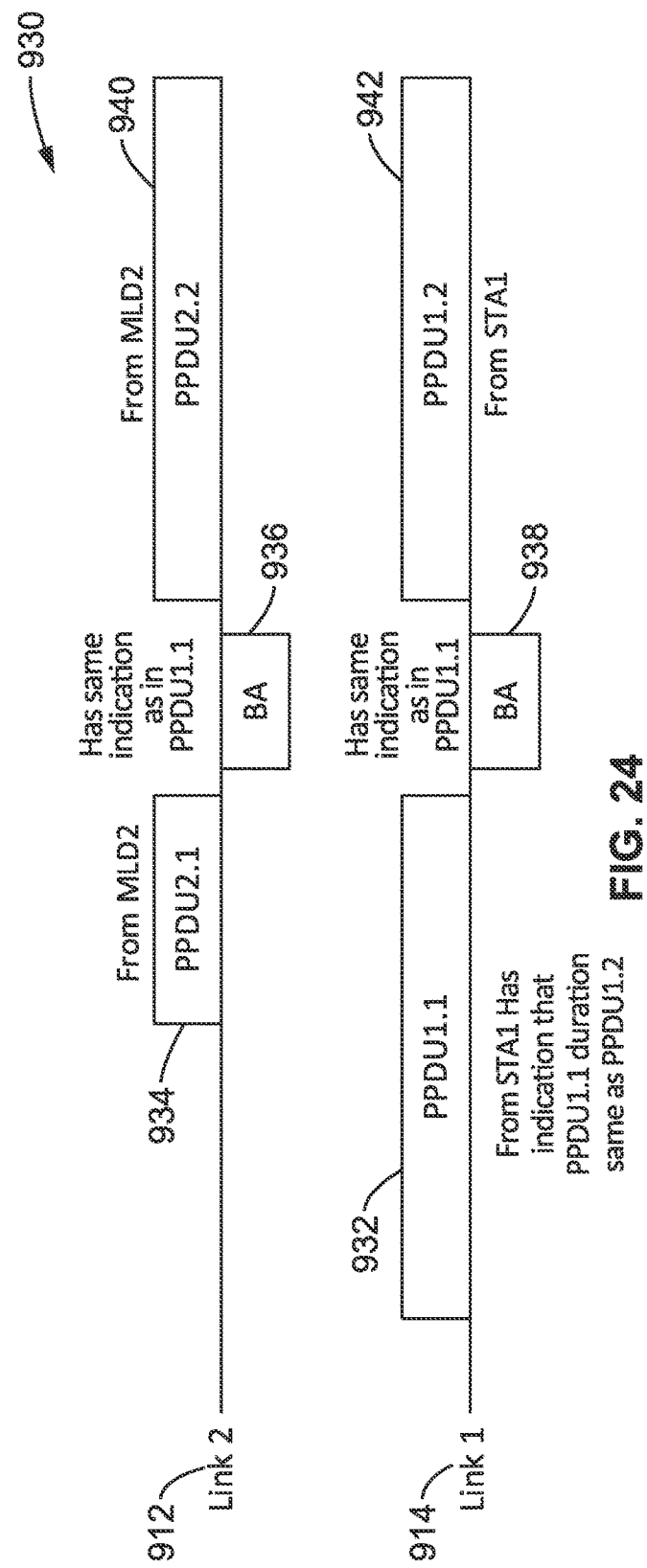
FIG. 24 is a communication diagram of a PPDU having an indication that the next data in the same TXOP has the same duration according to at least one embodiment of the present disclosure.

FIG. 24 illustrates an example embodiment 930 of Section 3 element 42 operation, in which a PPDU (e.g., PPDU1.1) has an indication that the next data (e.g., PPDU1.2) in the same TXOP has the same duration as PPDU1.1.

The figure depicts a link1 914 (primary link) and a link2 912 (secondary link). A PPDU1.1 932 is sent on link1 containing an indication to STA1 that PPDU1.1 duration is the same as PPDU1.2. PPDU1.2 934 is sent from MLD2, after which is seen BAs 936 and 938 which have the same indication as in PPDU1.1. Thus, the BA from AP MLD on link1 and link2 have the same indication, and the AP aligns the duration of the PPDUs on link1 and link2 carrying the BA.

Then MLD2 extends the TXOP by sending PPDU2.2 940 immediately after the BA on link2, without waiting to observe the preamble of PPDU1.2 on link1, and STA1 is seen sending PPDU1.2 942.

Figure 25:
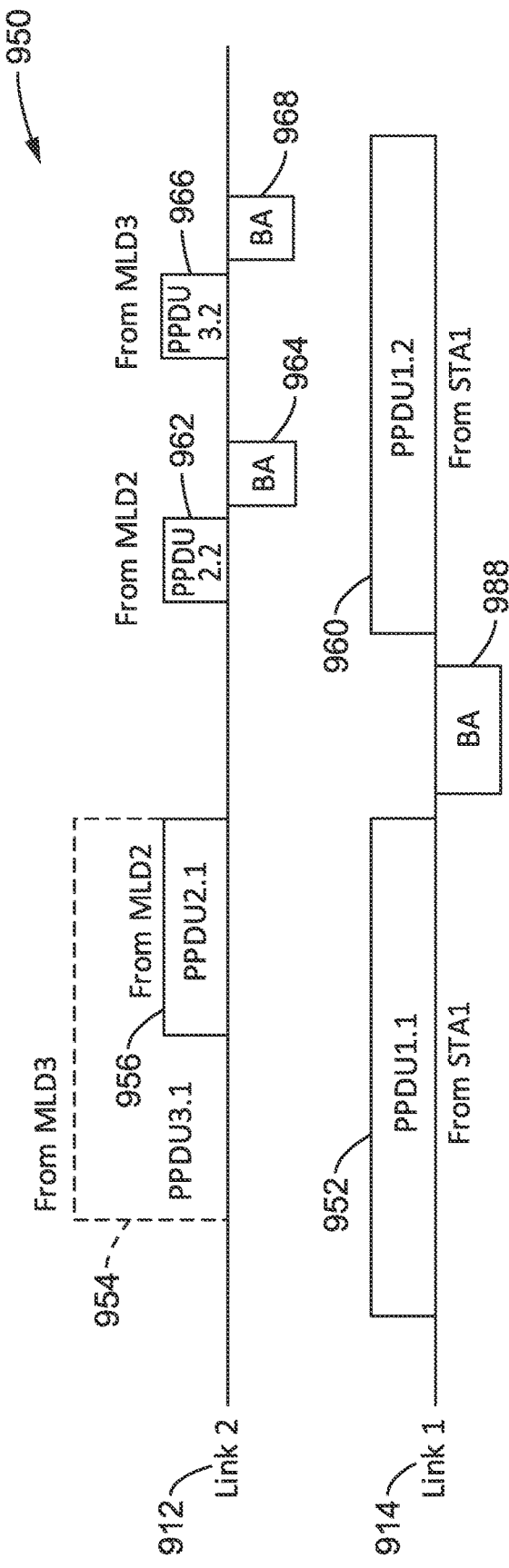
FIG. 25 is a communication diagram of multiple MLDs performing end-alignment to a given PPDU to send other PPDUs on link2 and in which a collision is experienced according to at least one embodiment of the present disclosure.

FIG. 25 illustrates an example embodiment 950 of Section 3 element 43 showing MLD2 and MLD3 performing end-alignment to PPDU1.1 to send PPDU2.1 and PPDU3.1 on link2 during which a collision arises.

The figure depicts a link1 914 (primary link) and a link2 912 (secondary link). A PPDU1.1 952 is sent from STA1 on link1, then PPDU3.1 is sent from MLD3 on link2 after which MLD2 sends PPDU2.1 956 which collides with PPDU3.1. A BA 958 is seen being sent on link1 only.

In the next access on link2, MLD2 and MLD3 then do not perform end-alignment to allow more access opportunities, at the expense that the BAs from AP on link2 create at least a portion of the self-interference on PPDU1.2. So PPDU1.2 960 is shown being sent from STA1 on link1, during which on link2 is seen PPDU2.2 962 sent from MLD2 followed by a BA 964, then PPDU3.2 966 sent from MLD3 followed by BA 968.

Figure 26:
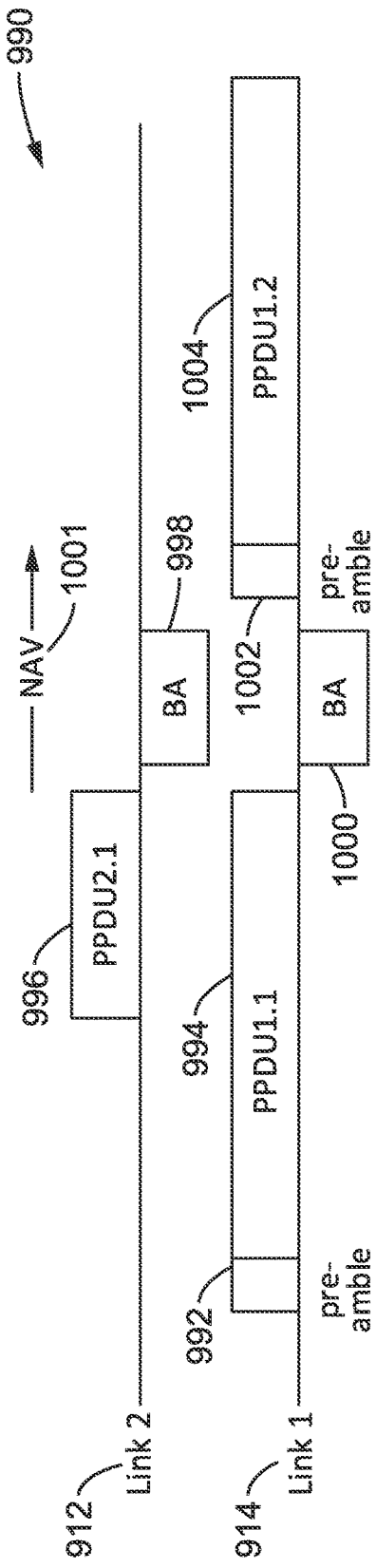
FIG. 26 is a communication diagram of an MLD access on link2 with end-alignment with a PPDU on link1 from another STA/MLD, and in which the NAV in MPDUs covers the duration of the preamble of the next PPDU on link1 according to at least one embodiment of the present disclosure.

FIG. 26 illustrates an example embodiment 990 of Section 3 element 44, depicting MLD2 access on link2 with end-alignment with PPDU1.1 on link1 from another STA/MLD. The NAV in MPDUs in PPDU2.1 covers the duration of the preamble of the next PPDU1.2 in the TXOP on link1.

The figure depicts a link1 914 (primary link) and a link2 912 (secondary link). PPDU1.1 994 is sent on link1 with a preamble 992, during which PPDU2.1 996 commences with end alignment with PPDU1.1. At the end of these PPDUs a NAV 1001 commences on link2. During the NAV the BAs 998 and 1000 are sent on link1 and link2. Then a PPDU1.2 1004 with preamble 1002 commences on link1 during the NAV on link2.

Thus, the extra NAV protection allows time for intra-BSS MLDs using link2 with end-alignment to observe the preamble/duration of the PPDU1.2, while protecting it from Overlapped BSS (OBSS) STAs occupying link2 at the time the PPDU1.2 preamble is being transmitted.

Figure 27:
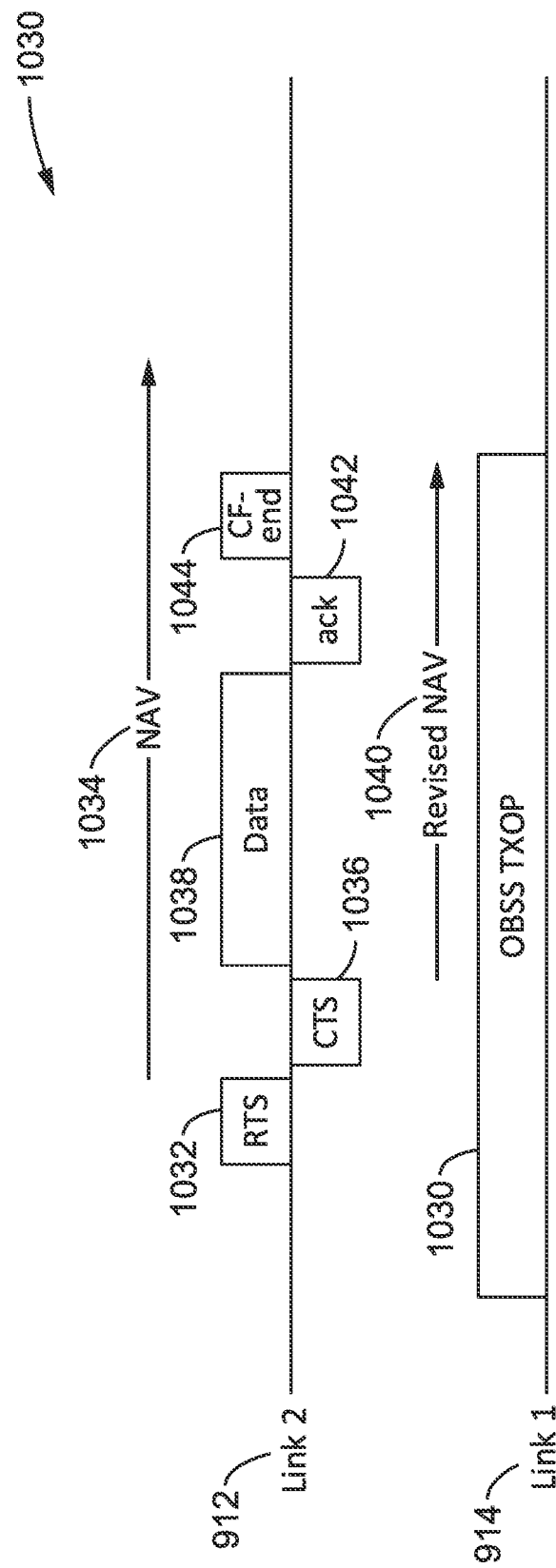
FIG. 27 is a communication diagram of a non-AP MLD detecting CCA busy on link1 caused by OBSS, and performing an access on link2 using RTS/CTS according to at least one embodiment of the present disclosure.

FIG. 27 illustrates an example embodiment 1030 of Section 3 element 46 describing a non-AP MLD detecting CCA busy on link1 caused by stations in an OBSS, and performing access on link2 using RTS.

The figure depicts a link1 914 (primary link) and a link2 912 (secondary link). An OBSS TXOP 1030 is seen on link1. After this is seen the non-AP MLD sends an RTS 1032 with NAV 1034 to which the AP replies with CTS 1036 and revising the NAV to revised NAV 1040 of AP MLD on link1. AP may require RTS to start TXOP on link1. During the revised NAV duration on link1, AP MLD may not reply with a CTS if it is receiving RTS on link1.

The non-AP MLD accessing on link2 transmits data 1038 and receives an ACK 1042, wherein the TXOP finishes by the end of the revised NAV 1040. After this the Contention Free period ends as signaled by CF-end 1044.

Figure 28:
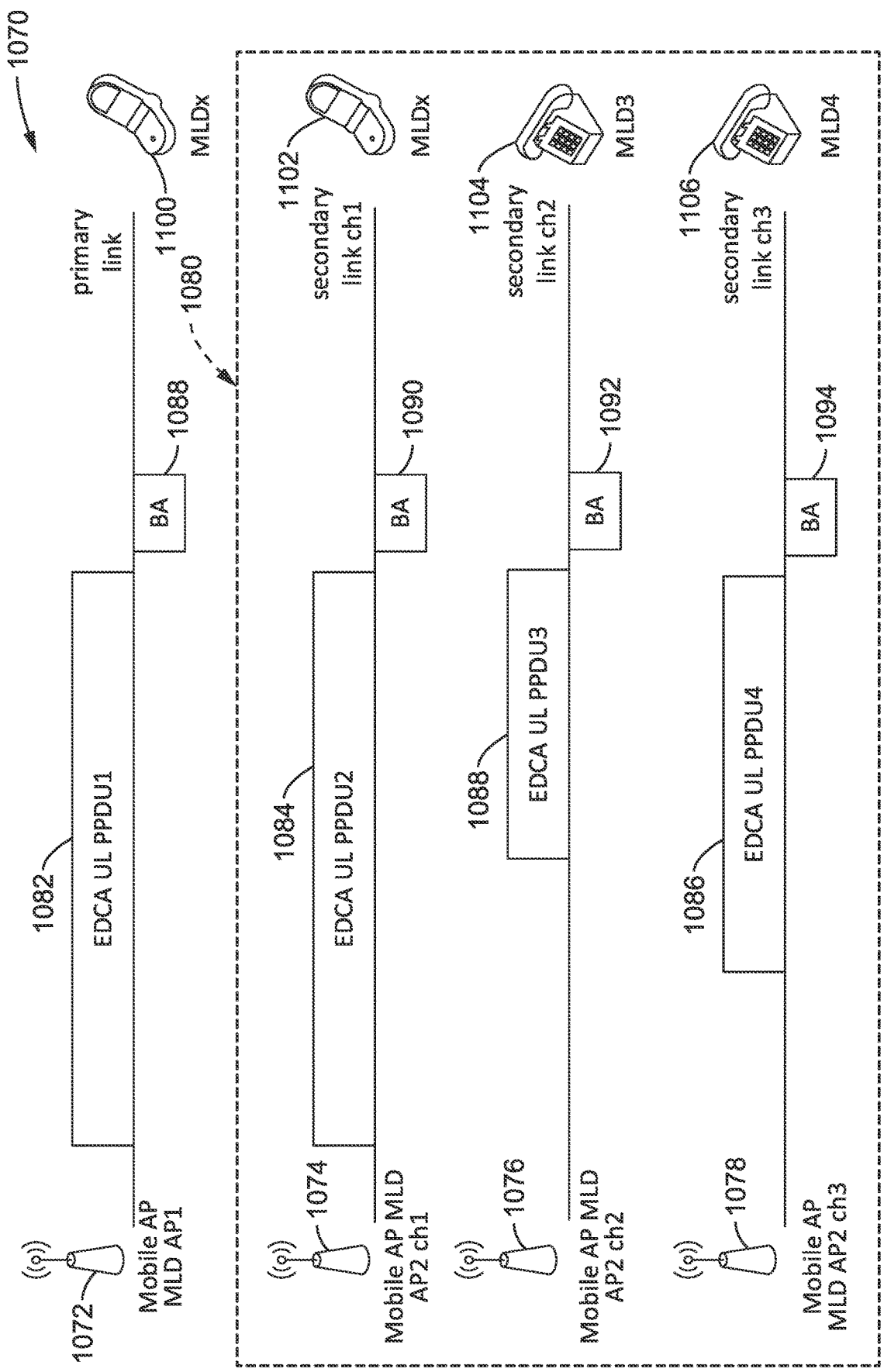
FIG. 28 is a communication diagram of an AP MLD assigning different secondary links to different MLDs according to at least one embodiment of the present disclosure.

FIG. 28 illustrates an example embodiment 1070 of Section 3 element 47 in which the AP MLD assigns the different secondary links to different MLDs. More specifically, the figure depicts the secondary link 1680 being divided into different channels of operation.

The figure depicts communications between mobile AP MLD AP1 1072 on the primary link, mobile AP MLD AP2 1074 on channel 1 of a secondary link, mobile AP MLD AP2 1076 on channel 2 of a secondary link, and mobile AP MLD AP2 1078 on channel 3 of a secondary link; shown respectively communicating with MLDx 1100, MLDx 1102, MLD3 1104 and MLD4 1106, for example MLDx, MLD3, MLD4 are effectively assigned different secondary links.

By way of example and not limitation, the example considers a limited available bandwidth (BW) as being a total BW available to the BSS as 160 MHz; with operating BW of the primary link being 100 MHz, and with each secondary link having a BW of 20 MHz.

NSTR MLDx with lower priority follows the baseline rule, sending PPDUs 1082, 1084 occupying primary and assigned secondary link. Then MLD3 and MLD4 with a higher priority use end-alignment with PPDU1 to send PPDU3 1088 and PPDU4 1086. After the PPDUs, ending at about the same time, is seen BAs 1088, 1090, 1092 and 1094.

MLD3 and MLD4 do not compete with each other when performing secondary link access with end-alignment, and padding overhead is smaller with a narrower BW secondary link. The lower priority traffic, such as exemplified from MLDx can still utilize the bulk of the BW, such as in this case about three-quarters (¾) of the overall BW.

Figure 29:
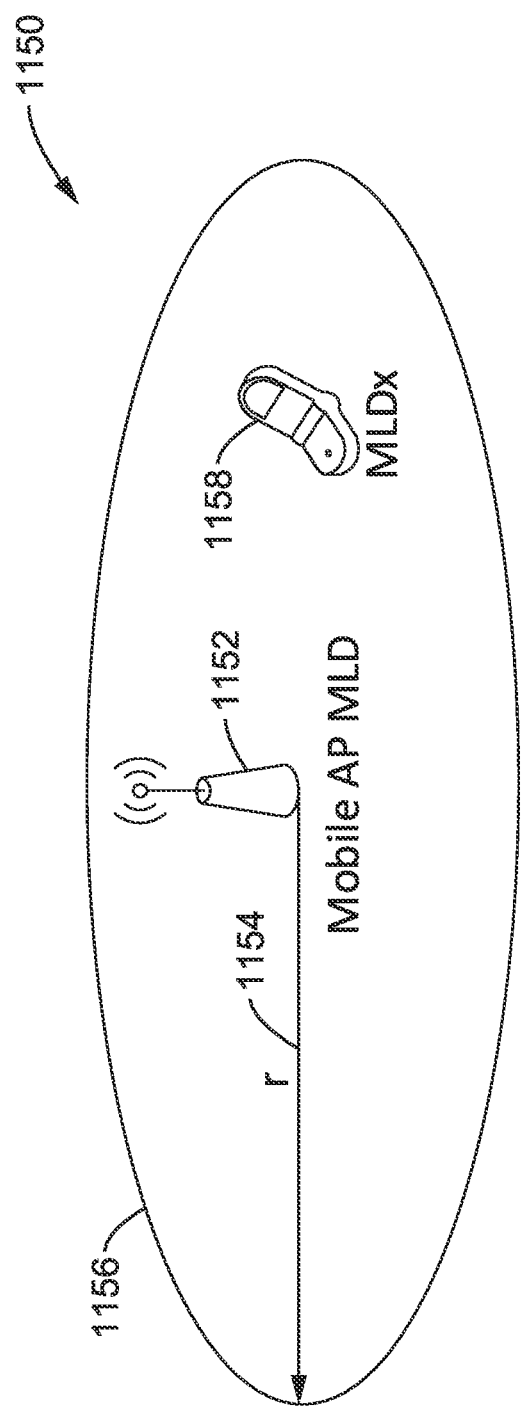
FIG. 29 is a communication topology diagram of an AP MLD requesting that another MLD use secondary link access with end-alignment to the primary link PPDU, and to transmit with sufficient power to overcome the hidden node problem according to at least one embodiment of the present disclosure.

FIG. 29 illustrates an example embodiment 1150 of Section 3 element 45 in which an AP MLD 1152 may request that the MLD 1158 use secondary link access with end-alignment to primary link PPDU1 from another STA/MLD, to transmit with sufficient power, such that there is a high probability that other MLDs wishing to perform the same access within distance r 1154, thus in a range 1156, from the AP can detect the transmission, and avoid the hidden node problem.

Thus, MLDx receives a PPDU carrying a message M with a normalized power p (in dBm) on link1. The message M defines a function:

$$f(p) = PL_2(PL_1^{-1}(p0-p)+r) + P_{min}$$

where $PL_n^{-1}(\ )$ is the inverse pathloss function on link n, $PL_n(\ )$ is the pathloss function on link n, p0 is the normalized transmit (tx) power (in dBm) of message M, $P_{min}$ is the normalized received power (in dBm) to detect CCA busy.

MLDx must transmit PPDU2 as per Section 3 element 2 with normalized power greater than or equal to f(p) on link2. Otherwise, it is not eligible to perform the secondary link access with end-alignment with a PPDU1 on link1.

STAs affiliated with a non-AP MLD that are associated with an NSTR mobile AP MLD and APs affiliated with an NSTR mobile AP MLD shall follow the procedure of start time sync PPDUs medium access when intending to transmit in the nonprimary link with the following additional constraints and with the exceptions of (a) and (b) below.

A STA affiliated with the non-AP MLD may initiate a PPDU transmission to its associated AP affiliated with the NSTR mobile AP MLD in the nonprimary link only if the STA affiliated with the same MLD in the primary link is also initiating the PPDU as a TXOP holder with the same start time.

An AP affiliated with the NSTR mobile AP MLD may initiate a PPDU transmission to its associated non-AP STA in the nonprimary link only if the AP affiliated with the same NSTR mobile AP MLD in the primary link is also initiating the PPDU as a TXOP holder with the same start time.

(a) A STA operating on the nonprimary link and affiliated with a non-AP MLD which has a pair of setup links that is a STR link pair, may perform a channel access procedure for PPDU end time alignment for both links, or (b) A STA operating on the nonprimary link and affiliated with a non-AP MLD may perform channel access assuming a TXOP limit equal to 0 when a backoff counter of the STA reaches zero, if the non-AP MLD has detected an ongoing UL intra-BSS PPDU transmission on the primary link.

The PPDU in the channel access should be end-aligned with the ongoing primary link PPDU and the PDDU shall not solicit an immediate response with a TXTIME that is longer than an Ack frame transmitted in non-HT format using the highest basic rate on the primary link. The STA operating on the nonprimary link and affiliated with the non-AP MLD, upon the non-AP MLD detecting an ongoing UL intra-BSS PPDU on the primary link, and the STA having a backoff counter already reached zero, may perform a new backoff procedure with CW[AC] and QSRC[AC] being left unchanged.

8. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) operating in a non-Access Point (non-AP) multi-link device (MLD) and communicating with an AP MLD which is not capable of simultaneous transmit and receive (STR) as a non-STR MLD, wherein the MLD is configured for wirelessly communicating with other wireless stations (STAs) in performing a multi-link operation (MLO) on a wireless local area network (WLAN) under an IEEE 802 protocol; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) monitoring a first link as a primary link, and a second link as a conditional link, of the non-AP MLD; (d)(ii) determining an expected length of a first data transmission by the non-AP MLD on said first link; (d)(iii) determining that said first data transmission is to be sent to the same AP MLD with which the non-AP MLD is attempting to communicate with; and (d)(iv) accessing said second link during said first data transmission on said first link and transmitting a second data transmission on said second link.

An apparatus for wireless communication in a network, the apparatus comprising: (a) a wireless communication circuit, as a wireless station (STA) operating in a non-Access Point (non-AP) multi-link device (MLD) and communicating with an AP MLD which is not capable of simultaneous transmit and receive (STR) as a non-STR MLD, wherein the MLD is configured for wirelessly communicating with other wireless stations (STAs) in performing a multi-link operation (MLO) on a wireless local area network (WLAN) under an IEEE 802 protocol; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) monitoring a first link as a primary link, and a second link as a conditional link, of the non-AP MLD; (d)(ii) determining an expected length of a first data transmission by the non-AP MLD on said first link; (d)(iii) determining that said first data transmission is to be sent to the same AP MLD with which the non-AP MLD is attempting to communicate with; (d)(iv) accessing said second link during said first data transmission on said first link and transmitting a second data transmission on said second link, with a start and/or an end of the second data transmission aligned with the respective start and/or end of the first data transmission; and (d)(v) wherein said first data transmission and said second data transmission each comprise a physical layer protocol data unit (PPDU) comprising a preamble and data fields.

A method of wireless communication in a network, comprising: (a) communicating between a wireless communication circuit, as a wireless station (STA) operating in a non-Access Point (non-AP) multi-link device (MLD), with an AP MLD which is not capable of simultaneous transmit and receive (STR) as a non-STR MLD, wherein the MLD is configured for wirelessly communicating with other wireless stations (STAs) in performing a multi-link operation (MLO) on a wireless local area network (WLAN) under an IEEE 802 protocol; (b) monitoring a first link as a primary link, and a second link as a conditional link, of the non-AP MLD; (c) determining an expected length of a first data transmission by the non-AP MLD on said first link; (d) determining that said first data transmission is to be sent to the same AP MLD with which the non-AP MLD is attempting to communicate with; and (e) accessing said second link during said first data transmission on said first link and transmitting a second data transmission on said second link.

The apparatus or method of any preceding implementation, wherein said first data transmission and said second data transmission each comprise a physical layer protocol data unit (PPDU) comprising a preamble and data fields.

The apparatus or method of any preceding implementation, wherein an end of the second data transmission is aligned with the end of the first data transmission.

The apparatus or method of any preceding implementation, further comprising the non-AP MLD performing enhanced distributed channel access (EDCA) uplink (UL) access to the AP MLD on the second link, as a conditional link, if either: (a) a STA affiliated to the non-AP MLD in the first link, as primary link, is initiating data transmission as a transmit opportunity (TXOP) holder with the same start time, or (b) a STA affiliated to the non-AP MLD in the first link is not initiating a data transmission as a TXOP holder.

The apparatus or method of any preceding implementation, wherein during said communicating with an AP MLD which is not capable of simultaneous transmit and receive (STR) as a non-STR MLD, the AP MLD sends a frame on the first link as selected from the group of frames consisting of trigger frames, acknowledgement (ACK) frames, block acknowledge (BA) frames, or frames which are sent in response to a frame sent by a non-AP device prior to the first data transmission.

The apparatus or method of any preceding implementation, wherein if the AP MLD sends a frame on the first link as a trigger frame which comprises a single-user (SU) trigger frame as a control frame prior to sending a data transmission.

The apparatus or method of any preceding implementation, wherein the frame sent by the non-AP device on the first link comprises information from which can be derived: (a) expected duration of data transmission; (b) expected duration of the acknowledgement of the data transmission; and (c) information about expected link occupancy by the sender.

The apparatus or method of any preceding implementation, wherein said control frame contains information selected from the group of information consisting of: (a) expected duration of data transmission; (b) expected minimum duration of acknowledgement for the data transmission; (c) identity of the AP affiliated with the AP MLD on the first link or the identity of the AP MLD; (d) the identity of the second link; (e) the network allocation vector (NAV) or clear channel assessment (CCA) status of the AP affiliated with the AP MLD on the second link; (f) information on whether the NAV was set, because: (f)(i) the AP affiliated with the AP MLD on the second link is a TXOP holder or responder, or (f)(ii) the AP is affiliated with the AP MLD on the second link is a third party to a TXOP on the second link and thus not directly involved in a communication but is within communication range.

The apparatus or method of any preceding implementation, wherein said non-AP MLD of claim 1 receives said control frame and determines expected characteristics of the data transmission from a preamble and start time of the data transmission to prevent overlapping the acknowledgement/block acknowledgement (ACK/BA) for the data transmission on the second link with the data transmission being performed on the first link.

The apparatus or method of any preceding implementation, wherein the expected characteristics of the data transmission are selected from the following information: (a) number of traffic identifiers (TIDs) in the data transmission; (b) number of medium-access-control (MAC) protocol data units (MPDUs) in the data transmission comprising a physical layer protocol data unit (PPDU); (c) forward error correction (FEC) padding as pre-FEC padding or post-FEC padding or as a combination of pre-FEC and post-FEC padding in the PPDU; and (d) information on modulation coding scheme (MCS) or number of spatial streams/Bandwidth of the PPDU.

The apparatus or method of any preceding implementation, wherein during said communicating with an AP MLD which is not capable of simultaneous transmit and receive (STR) as a non-STR MLD, the AP MLD also sends a frame on the second link having a start and/or end time matching that as the frame sent on the first link.

The apparatus or method of any preceding implementation, wherein the frame sent on the second link contains identical information as that send for said first link.

The apparatus or method of any preceding implementation, wherein if the expected duration of said first data transmission is below a pre-determined threshold, then the sender of said first data transmission is not required to send any control information before said first data transmission.

The apparatus or method of any preceding implementation, wherein if the expected duration of said first data transmission is below a pre-determined threshold, then said non-AP MLD is not allowed to perform uplink (UL) access on said second link even if all other conditions are satisfied.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
(a) a wireless station (STA) operating in a non-Access Point (non-AP) multi-link device (MLD) and communicating with a soft-AP MLD which is an Access Point MLD that is not capable of simultaneous transmit and receive (STR) as a non-STR MLD, wherein the MLD of the non-AP MLD is configured for wirelessly communicating with other wireless stations (STAs) in performing a multi-link operation (MLO) on a wireless local area network (WLAN) under an IEEE 802 protocol;
(b) a processor coupled to said wireless STA for operating on the WLAN;
(c) a non-transitory memory storing instructions executable by the processor for communicating with other STAs; and
(d) wherein said instructions, when executed by the processor, perform steps comprising:
(i) monitoring the operations of the soft AP MLD having a first link as a primary link, and a second link as a conditional link, by the non-AP MLD which is monitoring the first link and second link of said soft AP MLD;
(ii) determining, by the non-AP MLD, that the soft AP MLD has sent a frame on the first link as selected from the group of frames consisting of trigger frames, or frames which are sent in response to a frame sent by a different STA prior to its first data transmission to the first link of the soft AP MLD, and obtaining transmission duration and that the second link of the soft AP MLD is not being utilized; and
(iii) accessing said second link of the soft AP MLD, by the non-AP MLD, during said first data transmission on said first link and transmitting a second data transmission by the non-AP MLD, on said second link wherein the second data transmission is aligned with the end of the first data transmission according to the information obtained from the frame sent by the soft AP MLD.

2. The apparatus of claim 1, wherein said first data transmission and said second data transmission each comprise a physical layer protocol data unit (PPDU) comprising a preamble and data fields.

3. The apparatus of claim 1, further comprising the non-AP MLD performing enhanced distributed channel access (EDCA) uplink (UL) access to the soft AP MLD on the second link, as a conditional link, when either:

(a) a STA affiliated to the non-AP MLD in the first link, as primary link, is initiating data transmission as a transmit opportunity (TXOP) holder with the same start time, or
(b) a STA affiliated to the non-AP MLD in the first link is not initiating a data transmission as a TXOP holder.

4. The apparatus of claim 1, wherein the soft AP MLD sends the frame on the first link as a trigger frame which comprises a single-user (SU) trigger frame as a control frame prior to said non-AP STA sending a data transmission.

5. The apparatus of claim 4, wherein the frame contains information selected from the group of information consisting of: (a) expected duration of data transmission; (b) expected minimum duration of acknowledgement for the data transmission; (c) identity of the AP affiliated with the soft AP MLD on the first link or the identity of the AP MLD; (d) the identity of the second link; (e) the network allocation vector (NAV) or clear channel assessment (CCA) status of the AP affiliated with the soft AP MLD on the second link; (f) information on whether the NAV was set, because: (f) (i) the AP affiliated with the soft AP MLD on the second link is a TXOP holder or responder, or (f) (ii) the AP is affiliated with the soft AP MLD on the second link is a third party to a TXOP on the second link and thus not directly involved in a communication but is within communication range.

6. The apparatus of claim 5, wherein said non-AP MLD receives the frame and determines expected characteristics of the data transmission from a preamble and start time of the data transmission to prevent overlapping the acknowledgement/block acknowledgement (ACK/BA) for the data transmission on the second link with the data transmission being performed on the first link.

7. The apparatus of claim 6, wherein the expected characteristics of the data transmission are selected from the following information: (a) number of traffic identifiers (TIDs) in the data transmission; (b) number of medium-access-control (MAC) protocol data units (MPDUs) in the data transmission comprising a physical layer protocol data unit (PPDU); (c) forward error correction (FEC) padding as pre-FEC padding or post-FEC padding or as a combination of pre-FEC and post-FEC padding in the PPDU; and (d) information on modulation coding scheme (MCS) or number of spatial streams/Bandwidth of the PPDU.

8. The apparatus of claim 1, wherein the frame sent on the first link of the soft AP MLD comprises information from which can be derived: (a) expected duration of data transmission; (b) expected duration of the acknowledgement of the data transmission; and (c) information about expected link occupancy by the sender.

9. The apparatus of claim 1, wherein when the expected duration of said first data transmission is below a predetermined threshold, then the sender of said first data transmission is not required to send any control information before said first data transmission.

10. The apparatus of claim 1, wherein when the expected duration of said first data transmission is below a predetermined threshold, then said non-AP MLD is not allowed to perform uplink (UL) access on said second link even if when all other conditions are satisfied.

11. The apparatus of claim 1, wherein the non-AP MLD accesses said second link of said soft AP MLD, when said first link of said soft AP MLD is occupied.

12. The apparatus of claim 11, wherein accessing said second link of said soft AP MLD, when said first link of said soft AP MLD is occupied, overcomes previous limitations in which said secondary link could only be used by the non-AP MLD to initiate a transmission to the soft AP MLD when a STA affiliated to the same soft MLD of the said first link is also initiating a transmission as a transmit opportunity (TXOP) holder with the same start time.

13. An apparatus for wireless communication in a network, the apparatus comprising:
   (a) a wireless station (STA) operating in a non-Access Point (non-AP) multi-link device (MLD) and communicating with a soft AP MLD which is an Access Point MLD that is not capable of simultaneous transmit and receive (STR) as a non-STR MLD, wherein the MLD of the non-AP MLD is configured for wirelessly communicating with other wireless stations (STAs) in performing a multi-link operation (MLO) on a wireless local area network (WLAN) under an IEEE 802 protocol;
   (b) a processor coupled to said wireless STA for operating on the WLAN;
   (c) a non-transitory memory storing instructions executable by the processor for communicating with other STAs; and
   (d) wherein said instructions, when executed by the processor, perform steps comprising:
      (i) monitoring the operations of the soft AP having a first link as a primary link, and a second link as a conditional link, by the non-AP MLD which is monitoring the first link and second link of said soft AP MLD;
      (ii) determining an expected length of a first data transmission by the non-AP MLD on said first link;
      (iii) determining, by the non-AP MLD, that the soft AP MLD has sent a frame on both its first link and second link, as selected from the group of frames consisting of trigger frames, or frames which are sent in response to a frame sent by a different STA prior to its first data transmission to the first link of the soft AP MLD, and obtaining transmission duration and that the second link of the soft AP MLD is not being utilized;
      (iv) accessing said second link of the soft AP MLD, by the non-AP MLD, during said first data transmission on said first link and transmitting a second data transmission by the non-AP MLD, on said second link, wherein the second data transmission has a start and/or an end time which aligned with the respective start and/or end of the first data transmission; and
      (v) wherein said first data transmission and said second data transmission each comprise a physical layer protocol data unit (PPDU) comprising a preamble and data fields.

14. The apparatus of claim 13, further comprising the non-AP MLD performing enhanced distributed channel access (EDCA) uplink (UL) access to the soft AP MLD on the second link, as a conditional link, when either:
   (a) a STA affiliated to the non-AP MLD in the first link, as primary link, is initiating data transmission as a transmit opportunity (TXOP) holder with the same start time, or
   (b) a STA affiliated to the non-AP MLD in the first link is not initiating a data transmission as a TXOP holder.

15. The apparatus of claim 13, wherein the soft AP MLD sends a frame on the first link and second link as a trigger frame which comprises a single-user (SU) trigger frame as a control frame prior to said non-AP STA sending a data transmission.

16. The apparatus of claim 15, wherein the frame contains information selected from the group of information consisting of: (a) expected duration of data transmission; (b) expected minimum duration of acknowledgement for the data transmission; (c) identity of the AP affiliated with the soft AP MLD on the first link or the identity of the AP MLD; (d) the identity of the second link; (e) the network allocation vector (NAV) or clear channel assessment (CCA) status of the AP affiliated with the soft AP MLD on the second link; (f) information on whether the NAV was set, because: (f) (i) the AP affiliated with the soft AP MLD on the second link is a TXOP holder or responder, or (f) (ii) the AP is affiliated with the soft AP MLD on the second link is a third party to a TXOP on the second link and thus not directly involved in a communication but is within communication range.

17. The apparatus of claim 16, wherein said non-AP MLD receives the frame and determines expected characteristics of the data transmission from a preamble and start time of the data transmission to prevent overlapping the acknowledgement/block acknowledgement (ACK/BA) for the data transmission on the second link with the data transmission being performed on the first link.

18. The apparatus of claim 17, wherein the expected characteristics of the data transmission are selected from the following information: (a) number of traffic identifiers (TIDs) in the data transmission; (b) number of medium-access-control (MAC) protocol data units (MPDUs) in the data transmission comprising a physical layer protocol data unit (PPDU); (c) forward error correction (FEC) padding as pre-FEC padding or post-FEC padding or as a combination of pre-FEC and post-FEC padding in the PPDU; and (d) information on modulation coding scheme (MCS) or number of spatial streams/Bandwidth of the PPDU.

19. The apparatus of claim 13, wherein the frame sent on the first link and second link of the soft AP MLD comprises information from which can be derived: (a) expected duration of data transmission; (b) expected duration of the acknowledgement of the data transmission; and (c) information about expected link occupancy by the sender.

20. The apparatus of claim 13, wherein when the expected duration of said first data transmission is below a predetermined threshold, then said non-AP MLD is not allowed to perform uplink (UL) access on said second link if when all other conditions are satisfied.

21. A method of wireless communication in a network, comprising:
   (a) communicating between a wireless station (STA) operating in a non-Access Point (non-AP) multi-link device (MLD), with a soft AP MLD which is an Access Point MLD that is not capable of simultaneous transmit and receive (STR) as a non-STR MLD, wherein the MLD of the non-AP MLD is configured for wirelessly communicating with other wireless stations (STAs) in performing a multi-link operation (MLO) on a wireless local area network (WLAN) under an IEEE 802 protocol;
   (b) monitoring the operations of the soft AP MLD having a first link as a primary link, and a second link as a conditional link, by the non-AP MLD which is monitoring the first link and second link of said soft AP MLD;
   (c) determining, by the non-AP MLD, that the soft AP MLD has sent a frame on the first link as selected from the group of frames consisting of trigger frames, or frames which are sent in response to a frame sent by a different STA prior to its first data transmission to the first link of the soft AP MLD, and obtaining transmission duration and information that the second link of the soft AP MLD is not being utilized; and (d) accessing said second link of the soft AP MLD, by the non-AP MLD, during said first data transmission, by the non-AP MLD, on said first link and transmitting a second data transmission by the non-AP MLD, on said second link, wherein the second data transmission is aligned with the end of the first data transmission according to the information obtained from the frame sent by the soft AP MLD.

* * * * *